United States Patent
Peterson et al.

(10) Patent No.: US 9,410,035 B2
(45) Date of Patent: Aug. 9, 2016

(54) MODIFIED HETEROPHASIC POLYOLEFIN COMPOSITION

(71) Applicant: MILLIKEN & COMPANY, Spartanburg, SC (US)

(72) Inventors: Joseph J. Peterson, Simpsonville, SC (US); Daike Wang, Greer, SC (US); Jason D. Sprinkle, Woodruff, SC (US); Scott R. Trenor, Greenville, SC (US); Suchitra Datta, Spartanburg, SC (US); Sanjeev K. Dey, Spartanburg, SC (US); Eduardo Torres, Greer, SC (US)

(73) Assignee: MILLIKEN & COMPANY, Spartanburg, SC (US)

( * ) Notice: Subject to any disclaimer, the term of this patent is extended or adjusted under 35 U.S.C. 154(b) by 0 days.

(21) Appl. No.: 14/737,097

(22) Filed: Jun. 11, 2015

(65) Prior Publication Data

US 2016/0024289 A1    Jan. 28, 2016

Related U.S. Application Data

(60) Provisional application No. 62/028,905, filed on Jul. 25, 2014.

(51) Int. Cl.
| | |
|---|---|
| C08L 23/36 | (2006.01) |
| C08K 5/00 | (2006.01) |
| C08K 5/315 | (2006.01) |
| C08L 23/10 | (2006.01) |
| C08L 23/26 | (2006.01) |

(52) U.S. Cl.
CPC ............. *C08L 23/36* (2013.01); *C08K 5/005* (2013.01); *C08K 5/315* (2013.01); *C08L 23/10* (2013.01); *C08L 23/26* (2013.01); *C08L 2205/02* (2013.01); *C08L 2207/02* (2013.01)

(58) Field of Classification Search
CPC ......... C08L 23/26; C08L 23/36; C08L 23/10; C08L 2205/02; C08L 2207/02; C08L 23/16; C08K 5/315; C08K 5/005
See application file for complete search history.

(56) References Cited

U.S. PATENT DOCUMENTS

| | | | |
|---|---|---|---|
| 3,379,677 A | | 4/1968 | Dressler et al. |
| 4,039,593 A | * | 8/1977 | Kamienski et al. ........ C07F 1/02 525/385 |
| 5,159,016 A | * | 10/1992 | Inoue et al. ........... C08F 291/00 524/505 |
| 7,544,743 B2 | | 6/2009 | Ciardelli et al. |
| 2008/0220273 A1 | * | 9/2008 | Weaver ................... B32B 5/18 428/480 |
| 2008/0306198 A1 | * | 12/2008 | Zucchell et al. ........ C08K 5/098 524/394 |
| 2010/0168343 A1 | | 7/2010 | Harris et al. |
| 2011/0172368 A1 | | 7/2011 | Stolz-Dunn |
| 2012/0289620 A1 | | 11/2012 | Deheunynck et al. |
| 2014/0309358 A1 | * | 10/2014 | Jacob et al. ............. C08L 47/00 524/525 |
| 2015/0259453 A1 | * | 9/2015 | Peterson et al. ......... C08K 5/32 525/375 |

OTHER PUBLICATIONS

Al Sagheer et al., "Investigation of Radiation-Grafted and Radiation-Modified N-Vinyl-2-pyrrolidone onto Polypropylene Film", *Journal of Applied Polymer Science*, vol. 76, 282-289 (2000).

El-Sawy et al., "Electrical Properties of Modified-Grafted Polypropylene", *Journal of Applied Polymer Science*, vol. 104, 3797-3803 (2007).

Khalil et al., "γ-Irradiation Effects on the Thermal and Structural Characteristics of Modified, Grafted Polypropylene", *Journal of Applied Polymer Science*, vol. 102, 506-515 (2006).

Wan et al., Controlling degradation and branching reactions of polypropylene by different heteroaromatic ring derivatives, *Polymer Degradation and Stability* 97 (2012) 40-48.

Wan et al., "Preparation and characterization of long chain branched polypropylene mediated by different heteroaromatic ring derivatives", *Polymer* 54 (2013) 639-651.

International Search Report for PCT/US2015/019427 (6 pages).
Written Opinion of the International Searching Authority for PCT/US2015/019427 (6 pages).

* cited by examiner

*Primary Examiner* — Nathan M Nutter
(74) *Attorney, Agent, or Firm* — Robert M. Lanning

(57) ABSTRACT

A heterophasic polymer composition comprises a propylene polymer phase, an ethylene polymer phase, and a compatibilizing agent. The compatibilizing agent comprises (i) an acyclic carbon-carbon double bond having a first carbon atom and a second carbon atom, (ii) an electron withdrawing group directly bonded to the first carbon atom in the acyclic carbon-carbon double bond, and (iii) a second carbon-carbon multiple bond in conjugation with the acyclic carbon-carbon double bond, wherein the second carbon-carbon multiple bond is linked to the acyclic carbon-carbon double bond through the second carbon atom.

28 Claims, 2 Drawing Sheets

MODIFIED HETEROPHASIC POLYOLEFIN COMPOSITION

CROSS-REFERENCE TO RELATED PATENT APPLICATIONS

This application claims, pursuant to 35 U.S.C. §119(e)(1), priority to and the benefit of the filing date of U.S. Patent Application No. 62/028,905 filed on Jul. 25, 2014, which application is hereby incorporated by reference in its entirety.

TECHNICAL FIELD OF THE INVENTION

The present invention is directed to heterophasic polyolefin compositions having increased melt flow rates, as well as high impact strength and improved clarity. Of particular interest are modified polypropylene impact copolymers.

BACKGROUND

The melt flow rate (MFR) of a polymer resin is a function of its molecular weight. In general, increasing the melt flow rate allows the resin to be processed at lower temperatures and to fill complex part geometries. Various prior art methods of increasing the melt flow rate involve melt-blending the resin in an extruder with a compound capable of generating free radicals, such as a peroxide. The weight average molecular weight of the polymer is reduced and the MFR is increased. Increasing the melt flow rate by decreasing the molecular weight of the polyolefin polymer, however, has been found in many cases to have a detrimental effect on the strength of the modified polymer. For example, decreasing the molecular weight of the polymer can significantly lower the impact resistance of the polymer. And this lowered impact resistance can make the polymer unsuitable for use in certain applications or end uses. Accordingly, when extant technologies are utilized, one must strike a compromise between increasing the melt flow rate and undesirably decreasing the impact resistance of the polymer. This compromise often means that the melt flow rate is not increased to the desired level, which requires higher processing temperatures and/or results in lower throughputs.

A need therefore remains for additives and processes that can produce polymer compositions having an increased high melt flow while preserving, or even improving, the impact resistance of the polymer.

BRIEF SUMMARY OF THE INVENTION

The invention generally provides heterophasic polymer compositions comprising a propylene polymer phase and an ethylene polymer phase. A compatibilizing agent is also added to the compositions. The addition of the compatibilizing agent to the compositions has been observed to preserve, or even improve, the impact resistance of the polymer composition when the melt flow rate of the polymer composition is increased by the use of a free radical generator.

Thus, in a first embodiment, the invention provides a heterophasic polymer composition comprising:

(a) a propylene polymer phase comprising propylene polymers selected from the group consisting of polypropylene homopolymers and copolymers of propylene and up to 50 wt. % of one or more comonomers selected from the group consisting of ethylene and $C_4$-$C_{10}$ α-olefin monomers;

(b) an ethylene polymer phase comprising ethylene polymers selected from the group consisting of ethylene homopolymers and copolymers of ethylene and one or more $C_3$-$C_{10}$ α-olefin monomers; and (c) a compatibilizing agent, the compatibilizing agent comprising (i) an acyclic carbon-carbon double bond having a first carbon atom and a second carbon atom, (ii) an electron withdrawing group directly bonded to the first carbon atom in the acyclic carbon-carbon double bond, and (iii) a second carbon-carbon multiple bond in conjugation with the acyclic carbon-carbon double bond, wherein the second carbon-carbon multiple bond is linked to the acyclic carbon-carbon double bond through the second carbon atom.

In a second embodiment, the invention provides a heterophasic polymer composition comprising a continuous phase comprising polypropylene polymers selected from the group consisting of polypropylene homopolymers and copolymers of propylene and up to 80 wt. % of one or more comonomers selected from the group consisting of ethylene and $C_4$-$C_{10}$ α-olefin monomers and a discontinuous phase comprising elastomeric ethylene copolymers having an ethylene content of from 8 to 90 wt. % selected from the group consisting of copolymers of ethylene and one or more $C_3$-$C_{10}$ α-olefin monomers, provided that the propylene content of the propylene polymer phase is greater than the propylene content of the ethylene polymer phase, wherein the composition further comprises propylene polymers bonded to ethylene copolymers by a compatibilizing agent, wherein the compatibilizing agent comprises (i) an acyclic carbon-carbon double bond having a first carbon atom and a second carbon atom, (ii) an electron withdrawing group directly bonded to the first carbon atom in the acyclic carbon-carbon double bond, and (iii) a second carbon-carbon multiple bond in conjugation with the acyclic carbon-carbon double bond, wherein the second carbon-carbon multiple bond is linked to the acyclic carbon-carbon double bond through the second carbon atom.

In a third embodiment, the invention provides a heterophasic polyolefin polymer composition obtained by the process comprising the steps of:

(a) providing a propylene polymer phase comprising propylene polymers selected from the group consisting of polypropylene homopolymers and copolymers of propylene and up to 50 wt. % of one or more comonomers selected from the group consisting of ethylene and $C_4$-$C_{10}$ α-olefin monomers and an ethylene polymer phase comprising ethylene polymers selected from the group consisting of ethylene homopolymers and copolymers of ethylene and one or more $C_3$-$C_{10}$ α-olefin monomers provided that the ethylene content of the ethylene polymer phase is at least 8 wt. %, (b) providing a compatibilizing agent, wherein the compatibilizing agent comprises (i) an acyclic carbon-carbon double bond having a first carbon atom and a second carbon atom, (ii) an electron withdrawing group directly bonded to the first carbon atom in the acyclic carbon-carbon double bond, and (iii) a second carbon-carbon multiple bond in conjugation with the acyclic carbon-carbon double bond, wherein the second carbon-carbon multiple bond is linked to the acyclic carbon-carbon double bond through the second carbon atom; and (c) mixing the propylene polymer phase, the ethylene polymer phase and the compatibilizing agent in the presence of free carbon radicals, whereby propylene polymers are bonded to ethylene polymers by the compatibilizing agent, and whereby the propylene polymer phase and the ethylene polymer phase form a heterophasic composition.

In a fourth embodiment, the invention provides a method of making a heterophasic polyolefin polymer composition, the method comprising the steps of:

(a) providing a propylene polymer phase comprising propylene polymers selected from the group consisting of polypropylene homopolymers and copolymers of propylene and up to 50 wt. % of one or more comonomers selected from the group consisting of ethylene and $C_4$-$C_{10}$ α-olefin monomers, and an ethylene polymer phase comprising ethylene polymers selected from the group consisting of ethylene homopolymers and copolymers of ethylene and one or more $C_3$-$C_{10}$ α-olefin monomers provided that the ethylene content of the ethylene polymer phase is at least 8 wt. %, (b) providing a compatibilizing agent, wherein the compatibilizing agent comprises (i) an acyclic carbon-carbon double bond having a first carbon atom and a second carbon atom, (ii) an electron withdrawing group directly bonded to the first carbon atom in the acyclic carbon-carbon double bond, and (iii) a second carbon-carbon multiple bond in conjugation with the acyclic carbon-carbon double bond, wherein the second carbon-carbon multiple bond is linked to the acyclic carbon-carbon double bond through the second carbon atom; and (c) mixing the propylene polymer phase, the ethylene polymer phase and the compatibilizing agent, in the presence of free carbon radicals, whereby the compatibilizing agent reacts with propylene polymers and ethylene polymers thereby bonding propylene polymers to ethylene polymers, and whereby the propylene polymer phase and the ethylene polymer phase form a heterophasic composition.

DETAILED DESCRIPTION OF THE INVENTION

Figure 1:
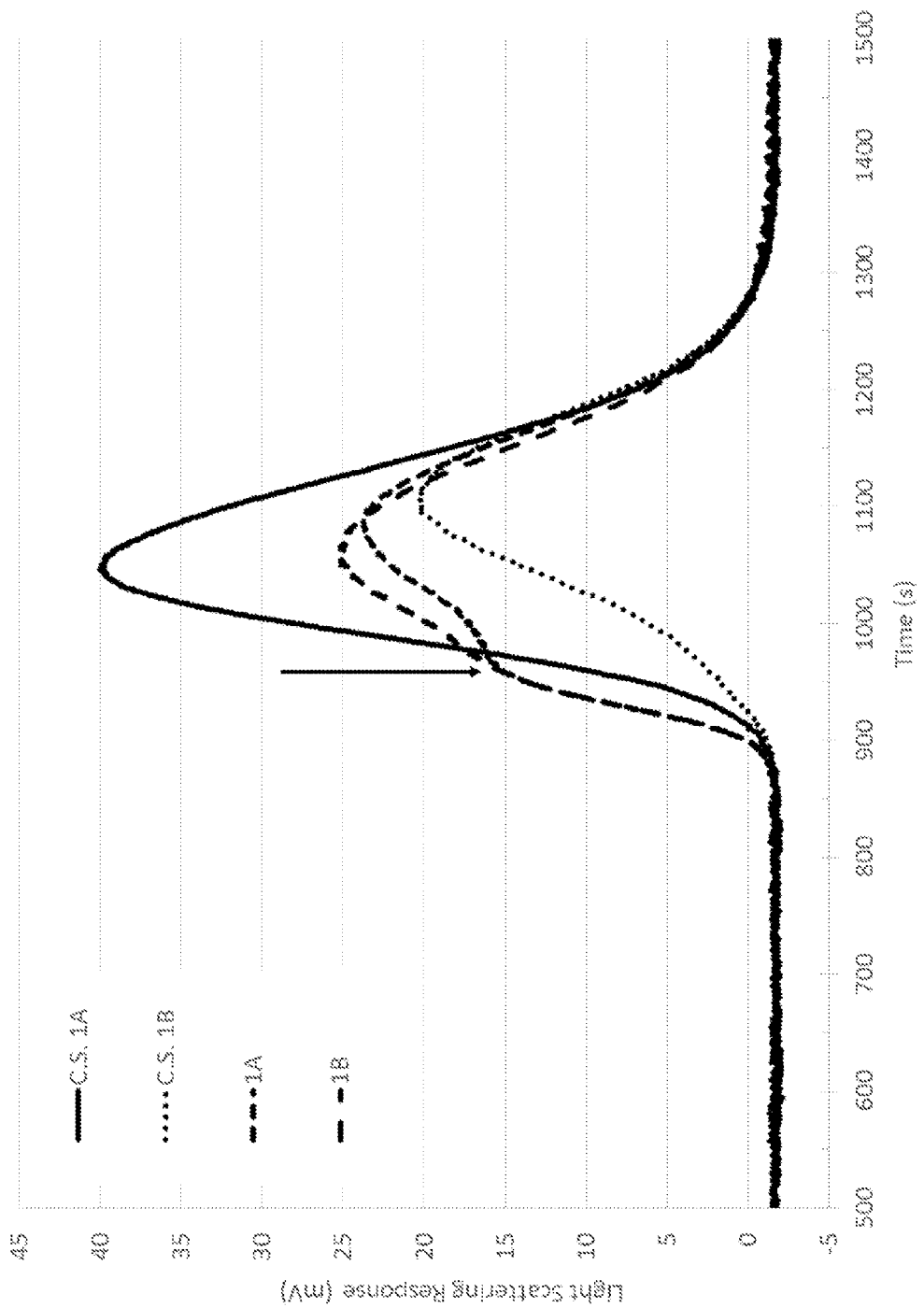
FIG. 1 shows gel permeation chromatography (GPC) curves for Samples 1A and 1B and C.S. 1A and C.S. 1B from Example 1.

The following definitions are provided to define several of the terms used throughout this application.

As used herein, the term "substituted alkyl groups" refers to univalent functional groups derived from substituted alkanes by removal of a hydrogen atom from a carbon atom of the alkane. In this definition, the term "substituted alkanes" refers to compounds derived from acyclic unbranched and branched hydrocarbons in which (1) one or more of the hydrogen atoms of the hydrocarbon is replaced with a non-hydrogen atom (e.g., a halogen atom) or a non-alkyl functional group (e.g., a hydroxy group, aryl group, or heteroaryl group) and/or (2) the carbon-carbon chain of the hydrocarbon is interrupted by an oxygen atom (as in an ether), a nitrogen atom (as in an amine), or a sulfur atom (as in a sulfide).

As used herein, the term "substituted cycloalkyl groups" refers to univalent functional groups derived from substituted cycloalkanes by removal of a hydrogen atom from a carbon atom of the cycloalkane. In this definition, the term "substituted cycloalkanes" refers to compounds derived from saturated monocyclic and polycyclic hydrocarbons (with or without side chains) in which (1) one or more of the hydrogen atoms of the hydrocarbon is replaced with a non-hydrogen atom (e.g., a halogen atom) or a non-alkyl functional group (e.g., a hydroxy group, aryl group, or heteroaryl group) and/or (2) the carbon-carbon chain of the hydrocarbon is interrupted by an oxygen atom, a nitrogen atom, or a sulfur atom.

As used herein, the term "substituted aryl groups" refers to univalent functional groups derived from substituted arenes by removal of a hydrogen atom from a ring carbon atom. In this definition, the term "substituted arenes" refers to compounds derived from monocyclic and polycyclic aromatic hydrocarbons in which one or more of the hydrogen atoms of the hydrocarbon is replaced with a non-hydrogen atom (e.g., a halogen atom) or a non-alkyl functional group (e.g., a hydroxy group).

As used herein, the term "substituted heteroaryl groups" refers to univalent functional groups derived from substituted heteroarenes by removal of a hydrogen atom from a ring atom. In this definition, the term "substituted heteroarenes" refers to compounds derived from monocyclic and polycyclic aromatic hydrocarbons in which (1) one or more of the hydrogen atoms of the hydrocarbon is replaced with a non-hydrogen atom (e.g., a halogen atom) or a non-alkyl functional group (e.g., a hydroxy group) and (2) at least one methine group (—C═) of the hydrocarbon is replaced by a trivalent heteroatom and/or at least one vinylidene group (—CH═CH—) of the hydrocarbon is replaced by a divalent heteroatom.

As used herein, the term "alkanediyl groups" refers to divalent functional groups derived from alkanes by removal of two hydrogen atoms from the alkane. These hydrogen atoms can be removed from the same carbon atom on the alkane (as in ethane-1,1-diyl) or from different carbon atoms (as in ethane-1,2-diyl).

As used herein, the term "substituted alkanediyl groups" refers to divalent functional groups derived from substituted alkanes by removal of two hydrogen atoms from the alkane. These hydrogen atoms can be removed from the same carbon atom on the substituted alkane (as in 2-fluoroethane-1,1-diyl) or from different carbon atoms (as in 1-fluoroethane-1,2-diyl). In this definition, the term "substituted alkanes" has the same meaning as set forth above in the definition of substituted alkyl groups.

As used herein, the term "cycloalkanediyl groups" refers to divalent functional groups derived from cycloalkanes by removal of two hydrogen atoms from the cycloalkane. These hydrogen atoms can be removed from the same carbon atom on the cycloalkane or from different carbon atoms.

As used herein, the term "substituted cycloalkanediyl groups" refers to divalent functional groups derived from substituted cycloalkanes by removal of two hydrogen atoms from the alkane. In this definition, the term "substituted cycloalkanes" has the same meaning as set forth above in the definition of substituted cycloalkyl groups.

As used herein, the term "arenediyl groups" refers to divalent functional groups derived from arenes (monocyclic and polycyclic aromatic hydrocarbons) by removal of two hydrogen atoms from ring carbon atoms.

As used herein, the term "substituted arenediyl groups" refers to divalent functional groups derived from substituted arenes by removal of two hydrogen atoms from ring carbon atoms. In this definition, the term "substituted arenes" refers to compounds derived from monocyclic and polycyclic aromatic hydrocarbons in which one or more of the hydrogen atoms of the hydrocarbon is replaced with a non-hydrogen atom (e.g., a halogen atom) or a non-alkyl functional group (e.g., a hydroxy group).

As used herein, the term "heteroarenediyl groups" refers to divalent functional groups derived from heteroarenes by removal of two hydrogen atoms from ring atoms. In this definition, the term "heteroarenes" refers to compounds derived from monocyclic and polycyclic aromatic hydrocarbons in which at least one methine group (—C═) of the hydrocarbon is replaced by a trivalent heteroatom and/or at least one vinylidene group (—CH═CH—) of the hydrocarbon is replaced by a divalent heteroatom.

As used herein, the term "substituted heteroarenediyl groups" refers to divalent functional groups derived from substituted heteroarenes by removal of two hydrogen atoms from ring atoms. In this definition, the term "substituted heteroarenes" has the same meaning as set forth above in the definition of substituted heteroaryl groups.

Unless otherwise indicated, conditions are 25° C., 1 atmosphere of pressure and 50% relative humidity, concentrations are by weight, and molecular weight is based on weight average molecular weight. The term "polymer" as used in the present application denotes a material having a weight average molecular weight (Mw) of at least 5,000. The term "copolymer" is used in its broad sense to include polymers containing two or more different monomer units, such as terpolymers, and unless otherwise indicated, includes random, block, and statistical copolymers. The concentration of ethylene or propylene in a particular phase or in the heterophasic composition is based on the weight of reacted ethylene units or propylene units relative to the total weight of polyolefin polymer in the phase or heterophasic composition, respectively, excluding any fillers or other non-polyolefin additives. The concentration of each phase in the overall heterogeneous polymer composition is based on the total weight of polyolefin polymers in the heterophasic composition, excluding any fillers or other non-polyolefin additives or polymers.

The subject heterophasic polyolefin polymers that may be advantageously modified according to the present invention are characterized by at least two distinct phases—a propylene polymer phase comprising propylene polymers selected from polypropylene homopolymers and copolymers of propylene and up to 50 wt. % of ethylene and/or $C_4$-$C_{10}$ α-olefins and an ethylene polymer phase comprising ethylene polymers selected from ethylene homopolymers and copolymers of ethylene and $C_3$-$C_{10}$ α-olefins. The ethylene content of the ethylene polymer phase is at least 8 wt. %. When the ethylene phase is a copolymer of ethylene and $C_3$-$C_{10}$ α-olefins, the ethylene content of the ethylene phase may range from 8 to 90 wt. %. In one embodiment of the invention, the ethylene content of the ethylene phase is at least 50 wt. %. Either the propylene polymer phase or the ethylene polymer phase may form the continuous phase and the other will form the discrete or dispersed phase. For example, the ethylene polymer phase may be the discontinuous phase and the polypropylene polymer phase may be the continuous phase. In one embodiment of the invention, the propylene content of the propylene polymer phase is greater than the propylene content of the ethylene polymer phase.

The relative concentrations of the propylene polymer phase and the ethylene polymer phase may vary over a wide range. By way of example, the ethylene polymer phase may comprise from 5 to 80 wt. % of the total of propylene polymers and ethylene polymers in the composition and the propylene polymer phase may comprise from 20 to 95 wt. % of the total of propylene polymers and ethylene polymers in the composition.

In various embodiments of the invention, (i) the ethylene content may range from 5 to 75 wt. %, or even 5 to 60 wt. %, based on the total propylene polymer and ethylene polymer content in the heterophasic composition, (ii) the ethylene polymer phase may be an ethylene-propylene or ethylene-octene elastomer, and/or (iii) the propylene content of the propylene polymer phase may be 80 wt. % or greater.

The present invention is particularly useful to modify a polypropylene impact copolymer. The impact copolymer may be characterized by a continuous phase comprising polypropylene polymers selected from polypropylene homopolymers and copolymers of propylene and up to 50 wt. % of ethylene and/or $C_4$-$C_{10}$ α-olefins and a discontinuous phase comprising elastomeric ethylene polymers selected from ethylene/$C_3$-$C_{10}$ α-olefin monomers and the ethylene polymers have an ethylene content of from 8 to 90 wt. %.

In various embodiments of the invention directed to propylene impact copolymers, (i) the ethylene content of the discontinuous phase may be from 8 to 80 wt. %, (ii) the ethylene content of the heterophasic composition may be from 5 to 30 wt. %, based on the total propylene polymers and ethylene polymers in the composition; (iii) the propylene content of the continuous phase may be 80 wt. % or greater and/or (iv) the discontinuous phase may be from 5 to 35 wt. % of the total propylene polymers and ethylene polymers in the composition.

Examples of heterophasic polyolefin polymers that may be modified are impact copolymers characterized by a relatively rigid, polypropylene homopolymer matrix (continuous phase) and a finely dispersed phase of ethylene-propylene rubber (EPR) particles. Polypropylene impact copolymer may be made in a two-stage process, where the polypropylene homopolymer is polymerized first and the ethylene-propylene rubber is polymerized in a second stage. Alternatively, the impact copolymer may be made in a three or more stages, as is known in the art. Suitable processes may be found in the following references: U.S. Pat. No. 5,639,822 and U.S. Pat. No. 7,649,052 B2. Examples of suitable processes to make polypropylene impact copolymers are Spheripol®, Unipol®, Mitsui process, Novolen process, Spherizone®, Catalloy®, Chisso process, Innovene®, Borstar®, and Sinopec process. These processes could use heterogeneous or homogeneous Ziegler-Natta or metallocene catalysts to accomplish the polymerization.

Heterophasic polyolefin polymer composition may be formed by melt mixing two or more polymer compositions, which form at least two distinct phases in the solid state. By way of example, the heterophasic polyolefin composition may comprise three distinct phases. The heterophasic polyolefin polymer composition may result from melt mixing two or more types of recycled polyolefin compositions. Accordingly, the phrase "providing a heterophasic polyolefin polymer composition" as used herein includes employing a polyolefin polymer composition in the process that is already heterophasic, as well as melt mixing two or more polyolefin polymer compositions during the process, wherein the two or more polyolefin polymer compositions form a heterophasic system. For example, the heterophasic polyolefin polymer may be made by melt mixing a polypropylene homopolymer and an ethylene/α-olefin copolymer, such as an ethylene/butene elastomer. Examples of suitable copolymers would be Engage™, Exact®, Vistamaxx®, Versify™, INFUSE™ Nordel™, Vistalon®, Exxelor™, and Affinity™. Furthermore, it can be understood that the miscibility of the polyolefin polymer components that form the heterophasic system may vary when the composition is heated above the melting point of the continuous phase in the system, yet the system will form two or more phases when it cools and solidifies. Examples of heterophasic polyolefin polymer compositions may be found in U.S. Pat. No. 8,207,272 B2 and EP 1 391 482 B1.

In one embodiment of the invention, the heterophasic polyolefin polymer to be modified does not have any polyolefin constituents with unsaturated bonds, in particular, both the propylene polymers in the propylene phase and the ethylene polymers in the ethylene phase are free of unsaturated bonds.

In another embodiment of the invention, in addition to the propylene polymer and ethylene polymer components, the heterophasic system may include an elastomer, such as elastomeric ethylene copolymers, elastomeric propylene copolymers, styrene block copolymers, such as styrene-butadiene-styrene (SBS), styrene-ethylene-butylene-styrene (SEBS), styrene-ethylene-propylene-styrene (SEPS) and styrene-isoprene-styrene (SIS), plastomers, ethylene-propylene-diene terpolymers, LLDPE, LDPE, VLDPE, polybutadiene, polyisoprene, natural rubber, and amorphous polyolefins. The rubbers may be virgin or recycled.

The heterophasic polyolefin polymer composition is modified by mixing the polymer composition with a compatibilizing agent in the presence of free radicals, which have been generated in the composition.

In one embodiment of the invention, the heterophasic polyolefin polymer composition is modified by melt mixing the polymer composition with a compatibilizing agent in the presence of free radicals, which have been generated in the composition. The melt mixing step is conducted under conditions such that the composition is heated to above the melting temperature of the major polyolefin component of the composition and mixed while in the molten state. Examples of suitable melt mixing processes include melt compounding, such as in an extruder, injection molding, and mixing in a Banbury mixer or kneader. By way of example, the mixture may be melt mixed at a temperature of from 160° C. to 300° C. In particular, propylene impact copolymers may be melt mixed at a temperature of from 180° C. to 290° C. The polymer composition (propylene polymer phase and ethylene polymer phase), compatibilizing agent and an organic peroxide may be melt compounded in an extruder, at a temperature above the melting temperature of all of the polyolefin polymers in the composition.

In another embodiment of the invention, the polymer may be dissolved in a solvent and the compatibilizing agent added to the polymer solution, and the radicals generated in solution. In another embodiment of the invention, the compatibilizing agent may be combined with the polymer in the solids state and free radicals could be generated during solid-state shear pulverization as described in *Macromolecules*, "Ester Functionalization of Polypropylene via Controlled Decomposition of Benzoyl Peroxide during Solid-State Shear Pulverization"—vol. 46, pp. 7834-7844 (2013).

Conventional processing equipment may be used to mix the propylene polymers, ethylene polymers and compatibilizing agent together in a single step, in the presence of free radicals that are either added to the mixture, such as an organic peroxide, or generated in-situ, such as by shear, UV light, etc. Nevertheless, it is also possible to mix various combinations of the components in multiple steps and in various sequences, and subsequently subject the mixture to conditions whereby the compatibilizing agent reacts with the polyolefin polymers, as described herein.

For example, the compatibilizing agent and/or the free radical generator (when a chemical compound is used) can be added to the polymer in the form of one or masterbatch compositions. Suitable masterbatch compositions can comprise the compatibilizing agent and/or the free radical generator in a carrier resin. The compatibilizing agent and/or the free radical generator can be present in the masterbatch composition in an amount of about 1 wt. % to about 80 wt. % based on the total weight of the composition. Any suitable carrier resin can be used in the masterbatch compositions, such as any suitable thermoplastic polymer. For example, the carrier resin for the masterbatch compositions can be a polyolefin polymer, such as a polypropylene impact copolymer, a polyethylene homopolymer, a linear low density polyethylene polymer, a polyolefin wax, or mixtures of such polymers. The carrier resin can also be a propylene polymer or an ethylene polymer that is the same as or similar to the proplylene polymer or ethylene polymer present in the heterophasic polyolefin polymer composition. Such a masterbatch composition would allow the end user to manipulate the ratio of propylene polymer(s) to ethylene polymer(s) present in the heterophasic polyolefin polymer composition. This may be preferred when the end user needs to modify the propylene to ethylene ratio of a commercial resin grade in order to achieve the desired set of properties (e.g., balance of impact and stiffness).

The compatibilizing agent comprises (i) an acyclic carbon-carbon double bond having a first carbon atom and a second carbon atom, (ii) an electron withdrawing group directly bonded to the first carbon atom in the acyclic carbon-carbon double bond, and (iii) a second carbon-carbon multiple bond in conjugation with the acyclic carbon-carbon double bond, wherein the second carbon-carbon multiple bond is linked to the acyclic carbon-carbon double bond through the second carbon atom. As utilized in describing the compatibilizing agent, the term "acyclic carbon-carbon double bond" refers to a carbon-carbon double bond that is not contained within a cyclic system, such as an aromatic ring. Thus, for example, the carbon-carbon double bonds in the vinylidene groups (—CH=CH—) contained within a phenyl ring are not acyclic carbon-carbon double bonds. However, the carbon-carbon double bond contained within the vinyl group of the compound styrene (i.e., phenylethene) is an acyclic carbon-carbon double bond. Further, carbon-carbon double bonds that are pendant to a cyclic system (e.g., the carbon-carbon bond is formed between a first carbon atom that is part of a cyclic system and a second carbon atom that is not part of a cyclic system) are also acyclic carbon-carbon double bonds.

The compatibilizing agent further comprises an electron withdrawing group directly bonded to one of the carbon atoms in the acyclic carbon-carbon double bond. The term "electron withdrawing group" is used here in its usual sense and refers to functional groups that draw electron density away from the acyclic carbon-carbon double bond. Examples of suitable electron withdrawing groups include, but are not limited to, halogens, cyano groups, nitro groups, carbonyl groups (such as those contained in, for example, esters and amides), perfluorinated alkyl groups, quaternary ammonium groups, and phosphoryl groups (such as those contained in, for example, phosphine oxides, phosphonates, and phosphinates). In a preferred embodiment, the electron withdrawing group is selected from the group consisting of cyano groups, nitro groups, and carbonyl groups.

The compatibilizing agent further comprises a second carbon-carbon multiple bond (i.e., another carbon-carbon multiple bond in addition to the acyclic carbon-carbon double bond). This second carbon-carbon multiple bond is in conjugation with the acyclic carbon-carbon double bond and is linked to the acyclic carbon-carbon double bond through the second carbon atom of the acyclic double bond (i.e., the carbon atom to which the electron withdrawing group is not attached). The second carbon-carbon multiple bond can be contained in either an acyclic or cyclic system. In a preferred embodiment, the second carbon-carbon is a double bond that is contained in an aromatic or heteroaromatic system, such as within the aromatic/heteroaromatic ring or in a substituent (e.g., a vinyl group) attached to the aromatic/heteroaromatic ring. In a preferred embodiment, the second carbon-carbon multiple bond does not have two or more electron donating groups attached to or in conjugation with the second carbon-carbon multiple bond. The term "electron donating group" is used here in its usual sense and refers to functional groups that donate electron density to the second carbon-carbon multiple bond.

In one preferred embodiment, the compatibilizing agent is selected from the group consisting of compounds conforming to the structure of Formula (I)

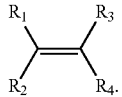
(I)

In the structure of Formula (I), $R_1$ is selected from the group consisting of aryl groups, substituted aryl groups, heteroaryl groups, substituted heteroaryl groups, and groups conforming to the structure of Formula (V)

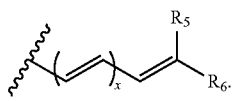
(V)

In the structure of Formula (V), $R_5$ and $R_6$ are independently selected from the group consisting of hydrogen, alkyl groups, substituted alkyl groups, cycloalkyl groups, substituted cycloalkyl groups, aryl groups, substituted aryl groups, heteroaryl groups, and substituted heteroaryl groups or $R_5$ and $R_6$ can be combined to form a cyclic structure. The variable x is an integer selected from the group consisting of 0, 1, and 2. In a preferred embodiment, the variable x is 0, $R_5$ is hydrogen, and $R_6$ is selected from the group consisting of aryl groups (e.g., $C_6$-$C_{12}$ aryl groups), substituted aryl groups (e.g., $C_6$-$C_{12}$ substituted aryl groups), heteroaryl groups (e.g., $C_4$-$C_{12}$ heteroaryl groups), and substituted heteroaryl groups (e.g., $C_4$-$C_{12}$ substituted heteroaryl groups).

In the structure of Formula (I), $R_2$ is selected from the group consisting of hydrogen, halogens, alkyl groups, substituted alkyl groups, aryl groups, substituted aryl groups, heteroaryl groups, and substituted heteroaryl groups. If $R_1$ and $R_2$ are both aromatic groups, then (i) $R_1$ and $R_2$ are bridged by a direct bond, an alkanediyl group (e.g. a methanediyl group), an oxygen atom, a sulfur atom, or a nitrogen atom (e.g., a —N(H)— group), or (ii) at least one of $R_1$ and $R_2$ is selected from the group consisting of substituted aryl groups substituted with an electron withdrawing group, heteroaryl groups, and substituted heteroaryl groups.

In a preferred embodiment of the structure of Formula (I), at least one of $R_1$ and $R_2$ is a group conforming to the structure of Formula (C), (CX), or (CXV)

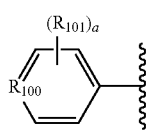
(C)

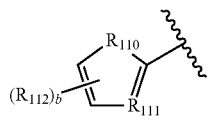
(CX)

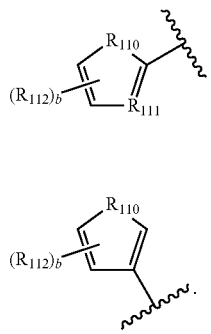
(CXV)

In the structure of Formula (C), $R_{100}$ is selected from the group consisting of C(H), C($R_{101}$), and a nitrogen atom. The variable a is an integer from 0 to 4. Each $R_{101}$ is independently selected from the group consisting alkyl groups (e.g., $C_1$-$C_{10}$ alkyl groups), substituted alkyl groups (e.g., $C_1$-$C_{10}$ substituted alkyl groups), aryl groups (e.g., $C_6$-$C_{12}$ aryl groups), substituted aryl groups (e.g., $C_6$-$C_{12}$ substituted aryl groups), heteroaryl groups (e.g., $C_4$-$C_{12}$ heteroaryl groups), substituted heteroaryl groups (e.g., $C_4$-$C_{12}$ substituted heteroaryl groups), halogens, nitro groups, cyano groups, amine groups, hydroxy groups, alkoxy groups (e.g., $C_1$-$C_{10}$ alkoxy groups), aryloxy groups (e.g., $C_6$-$C_{12}$ aryloxy groups), alkenyl groups (e.g., $C_2$-$C_{10}$ alkenyl groups), alkynyl groups (e.g., $C_2$-$C_{10}$ alkynyl groups), alkyl ester groups (e.g., $C_1$-$C_{10}$ alkyl ester groups), and aryl ester groups (e.g., $C_6$-$C_{12}$ aryl ester groups). Further, two adjacent $R_{101}$ groups can be linked to form a fused ring structure, such as a polycyclic aryl group. In the structure of Formula (CX), $R_{110}$ is selected from the group consisting of an oxygen atom, a sulfur atom, and N($R_{115}$). $R_{115}$ is selected from the group consisting of hydrogen, alkyl groups (e.g., $C_1$-$C_{10}$ alkyl groups), substituted alkyl groups (e.g., $C_1$-$C_{10}$ substituted alkyl groups), aryl groups (e.g., $C_6$-$C_{12}$ aryl groups), and substituted aryl groups (e.g., $C_6$-$C_{12}$ substituted aryl groups). $R_{111}$ is selected from the group consisting of C(H), C($R_{112}$), and a nitrogen atom. $R_{112}$ is selected from the group consisting of alkyl groups (e.g., $C_1$-$C_{10}$ alkyl groups), substituted alkyl groups (e.g., $C_1$-$C_{10}$ substituted alkyl groups), aryl groups (e.g., $C_6$-$C_{12}$ aryl groups), substituted aryl groups (e.g., $C_6$-$C_{12}$ substituted aryl groups), heteroaryl groups (e.g., $C_4$-$C_{12}$ heteroaryl groups), substituted heteroaryl groups (e.g., $C_4$-$C_{12}$ substituted heteroaryl groups), halogens, nitro groups, cyano groups, amine groups, hydroxy groups, alkoxy groups (e.g., $C_1$-$C_{10}$ alkoxy groups), aryloxy groups (e.g., $C_6$-$C_{12}$ aryloxy groups), alkenyl groups (e.g., $C_1$-$C_{10}$ alkenyl groups), alkynyl groups (e.g., $C_2$-$C_{10}$ alkynyl groups), alkyl ester groups (e.g., $C_2$-$C_{10}$ alkyl ester groups), and aryl ester groups (e.g., $C_6$-$C_{12}$ aryl ester groups). Further, two adjacent $R_{112}$ groups can be linked to form a fused ring structure, such as a polycyclic aryl group. The variable b is an integer from 0 to 2. In the structure of Formula (CXV), $R_{110}$ and $R_{112}$ are selected from the same groups described above for Formula (CX), and the variable c is an integer from 0 to 3.

In the structure of Formula (I), $R_3$ and $R_4$ are independently selected from the group consisting of hydrogen, alkyl groups, substituted alkyl groups, cycloalkyl groups, substituted cycloalkyl groups, cyano groups, nitro groups, and groups conforming to a structure of Formula (VI), (VII), (VIII), or (IX)

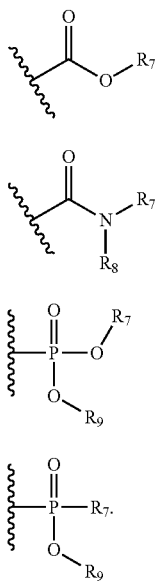

In the structures of Formulae (VI), (VII), (VIII), and (IX), $R_7$ and $R_9$ are independently selected from the group consisting of alkyl groups (e.g., $C_1$-$C_{22}$ alkyl groups), substituted alkyl groups (e.g., $C_1$-$C_{22}$ substituted alkyl groups), cycloalkyl groups (e.g., $C_3$-$C_{22}$ cycloalkyl groups), substituted cycloalkyl groups (e.g., $C_3$-$C_{22}$ substituted cycloalkyl groups), aryl groups (e.g., $C_6$-$C_{22}$ aryl groups), substituted aryl groups (e.g., $C_6$-$C_{22}$ substituted aryl groups), heteroaryl groups (e.g., $C_4$-$C_{22}$ heteroaryl groups), and substituted heteroaryl groups (e.g., $C_4$-$C_{22}$ substituted heteroaryl groups). $R_8$ is selected from the group consisting of hydrogen, alkyl groups (e.g., $C_1$-$C_{22}$ alkyl groups), substituted alkyl groups (e.g., $C_1$-$C_{22}$ substituted alkyl groups), cycloalkyl groups (e.g., $C_3$-$C_{22}$ cycloalkyl groups), substituted cycloalkyl groups (e.g., $C_3$-$C_{22}$ substituted cycloalkyl groups), aryl groups (e.g., $C_6$-$C_{22}$ aryl groups), substituted aryl groups (e.g., $C_6$-$C_{22}$ substituted aryl groups), heteroaryl groups (e.g., $C_4$-$C_{22}$ heteroaryl groups), and substituted heteroaryl groups (e.g., $C_4$-$C_{22}$ substituted heteroaryl groups). For groups conforming to the structure of Formula (VIII), $R_7$ and $R_9$ can be combined to form a cyclic structure. Lastly, in the structure of Formula (I), at least one of $R_3$ and $R_4$ is selected from the group consisting of cyano groups, nitro groups, and groups conforming to a structure of Formula (VI), (VII), (VIII), or (IX). In a preferred embodiment, $R_3$ and $R_4$ are independently selected from the group consisting of hydrogen, cyano groups, nitro groups, and groups conforming to the structure of Formula (VI), where $R_7$ is an alkyl group (e.g., a $C_1$-$C_{22}$ alkyl group).

In another preferred embodiment, the compatibilizing agent is selected from the group consisting of compounds conforming to the structure of Formula (X)

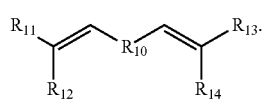

In the structure of Formula (X), $R_{10}$ is selected from the group consisting of arenediyl groups, substituted arenediyl groups, heteroarenediyl groups, substituted heteroarenediyl groups, and groups conforming to the structure of Formula (XV)

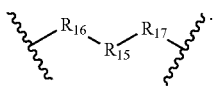

In the structure of Formula (XV), $R_{15}$ is selected from the group consisting of a direct bond between $R_{16}$ and $R_{17}$, an oxygen atom, an alkanediyl group, and a substituted alkanediyl group. $R_{16}$ and $R_{17}$ are independently selected from the group consisting of arenediyl groups, substituted arenediyl groups, heteroarenediyl groups, and substituted heteroarenediyl groups. In a preferred embodiment, $R_{10}$ is a group conforming to a structure selected from the group consisting of Formulae (CXX) (CXXV), (CXXX), and (CXXXV)

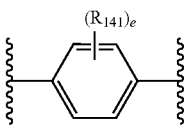

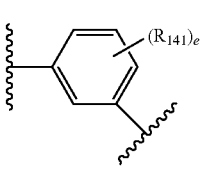

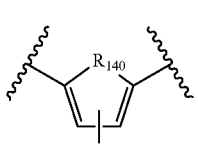

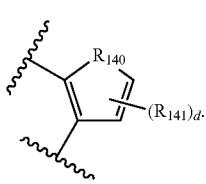

In the structures of Formulae (CXXX) and (CXXXV), $R_{140}$ is selected from the group consisting of an oxygen atom, a sulfur atom, —N(H)—, and —N($R_{145}$)—, where $R_{145}$ is selected from the group consisting of $C_1$-$C_{10}$ alkyl groups and $C_6$-$C_{12}$ aryl groups. In the structures of Formulae (CXX), (CXXV), (CXXX), and (CXXXV), each $R_{141}$ is selected from the group consisting of halogen atoms. The variable d is an integer from 0 to 2, and the variable e is an integer from 0 to 4. In another preferred embodiment, $R_{10}$ is a group conforming to the structure of Formula (XV) in which $R_{15}$ is selected from a direct bond and an oxygen atom and $R_{16}$ and $R_{17}$ are groups conforming to the structure of Formula (CXX).

In the structure of Formula (X), $R_{11}$, $R_{12}$, $R_{13}$, and $R_{14}$ are independently selected from the group consisting of hydrogen, alkyl groups, substituted alkyl groups, cycloalkyl groups, substituted cycloalkyl groups, cyano groups, nitro groups, and groups conforming to a structure of Formula (VI), (VII), (VIII), or (IX) as described above. In the structure of Formula (X), at least one of $R_{11}$ and $R_{12}$ and at least one of $R_{13}$ and $R_{14}$ is selected from the group consisting of cyano groups, nitro groups, and groups conforming to a structure of Formula (VI), (VII), (VIII), or (IX).

In another preferred embodiment, the compatibilizing agent is selected from the group consisting of compounds conforming to the structure of Formula (XX)

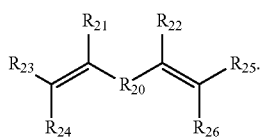

(XX)

In the structure of Formula (XX), $R_{20}$ is a divalent linking group. The divalent linking group can be any suitable divalent linking group. Suitable divalent linking groups include, but are not limited to, alkanediyl groups, substituted alkanediyl groups, cycloalkanediyl groups, substituted cycloalkanediyl groups, arenediyl groups, substituted arenediyl groups, heteroarenediyl groups, and substituted heteroarenediyl groups. In one preferred embodiment, $R_{20}$ is a group conforming to the structure of Formula (XXV)

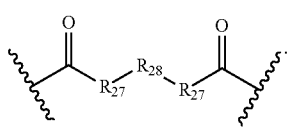

(XXV)

In the structure of Formula (XXV), $R_{27}$ is selected from the group consisting of an oxygen atom, —N(H)—, and —N($R_{29}$)—, where $R_{29}$ is selected from the group consisting of alkyl groups, substituted alkyl groups, cycloalkyl groups, and substituted cycloalkyl groups. $R_{28}$ is selected from the group consisting of alkanediyl groups and cycloalkanediyl groups. In a preferred embodiment, $R_{27}$ are oxygen atoms and $R_{28}$ is an alkandiyl group (e.g., a $C_1$-$C_8$ alkanediyl group). In another preferred embodiment, $R_{20}$ is a group conforming to the structure of Formula (XXX)

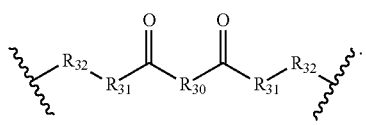

(XXX)

In the structure of Formula (XXX), $R_{30}$ is selected from the group consisting of alkanediyl groups and cycloalkanediyl groups. $R_{31}$ is selected from the group consisting of an oxygen atom, —N(H)—, and —N($R_{29}$)—, where $R_{29}$ is selected from the group consisting of alkyl groups, substituted alkyl groups, cycloalkyl groups, and substituted cycloalkyl groups. $R_{32}$ is selected from the group consisting of arenediyl groups, substituted arenediyl groups, heteroarenediyl groups, substituted heteroarenediyl groups, and —$R_{35}R_{36}$—, where $R_{35}$ is selected from the group consisting of arenediyl groups, substituted arenediyl groups, heteroarenediyl groups, and substituted heteroarenediyl groups, and $R_{36}$ is selected from the group consisting of alkanediyl groups (e.g., $C_1$-$C_4$ alkanediyl groups). In a preferred embodiment, $R_{30}$ is an alkanediyl group (e.g., a $C_1$-$C_8$ alkanediyl group), $R_{31}$ are oxygen atoms, and $R_{32}$ are selected from heteroareneidyl groups, substituted heteroarenediyl groups, and —$R_{35}R_{36}$—. More specifically, in such a preferred embodiment, $R_{32}$ preferably conforms to the structure of Formula (XL)

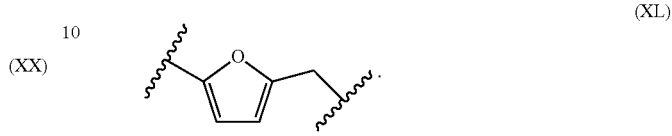

(XL)

In the structure of Formula (XX), $R_{21}$ and $R_{22}$ are selected from the group consisting of cyano groups, nitro groups, and groups conforming to a structure of Formula (VI), (VII), (VIII), or (IX) as described above. $R_{23}$, $R_{24}$, $R_{25}$, and $R_{26}$ are independently selected from the group consisting of hydrogen, alkyl groups, substituted alkyl groups, cycloalkyl groups, substituted cycloalkyl groups, aryl groups, substituted aryl groups, heteroaryl groups, substituted heteroaryl groups, and groups conforming to the structure of Formula (V) as described above. In the structure of Formula (XX), at least one of $R_{23}$ and $R_{24}$ and at least one of $R_{25}$ and $R_{26}$ is selected from the group consisting of aryl groups, substituted aryl groups, heteroaryl groups, substituted heteroaryl groups, and groups conforming to the structure of Formula (V). Further, if $R_{23}$ and $R_{24}$ are both aromatic groups, then (i) $R_{23}$ and $R_{24}$ are bridged by a direct bond or an alkyl group or (ii) at least one of $R_{23}$ and $R_{24}$ is selected from the group consisting of substituted aryl groups substituted with an electron withdrawing group, heteroaryl groups, and substituted heteroaryl groups. And, if $R_{25}$ and $R_{26}$ are both aromatic groups, then (i) $R_{25}$ and $R_{26}$ are bridged by a direct bond or an alkyl group or (ii) at least one of $R_{25}$ and $R_{26}$ is selected from the group consisting of substituted aryl groups substituted with an electron withdrawing group, heteroaryl groups, and substituted heteroaryl groups.

The concentration of the compatibilizing agent in the composition can be varied to meet the objectives of the end user. For example, the concentration can be varied in order to achieve a desired increase in the MFR of the polymer composition with a minimal decrease (or potentially even an increase) in the strength of the polymer, in particular the impact strength. In a preferred embodiment, the compatibilizing agent can be present in an amount of about 10 ppm or more, about 50 ppm or more, about 100 ppm or more, about 150 ppm or more, or about 200 ppm or more, based on the total weight of the polymer composition. In another preferred embodiment, the compatibilizing agent can be present in an amount of about 5 wt. % (50,000 ppm) or less, about 4 wt. % (40,000 ppm) or less, about 3 wt. % (30,000 ppm) or less, about 2 wt. % (20,000 ppm) or less, about 1 wt. % (10,000 ppm) or less, or about 0.5 wt. % (5,000 ppm) or less, based on the total weight of the polymer composition. Thus, in certain preferred embodiments, the compatibilizing agent can be present in an amount of about 10 to about 50,000 ppm, about 100 to about 10,000 ppm, or about 200 to about 5,000 ppm, based on the total weight of the polymer composition.

When a chemical free radical generator is employed (as discussed below), the concentration of the compatibilizing agent in the polymer composition can additionally or alternatively be expressed in terms of a ratio between the amount of the compatibilizing agent and the amount of the chemical free radical generator. In order to normalize this ratio for differences in the molecular weight of compatibilizing agents and number of peroxide bonds in the chemical free radical generators, the ratio is usual expressed as a ratio of the number of moles of compatibilizing agent present in the composition to the molar equivalents of peroxide bonds (O—O bonds) present from the addition of the chemical free radical generator. Preferably, the ratio (i.e., ratio of moles of compatibilizing agent to molar equivalents of peroxide bonds) is about 1:10 or more, about 1:5 or more, about 3:10 or more, about 2:5 or more, about 1:2 or more, about 3:5 or more, about 7:10 or more, about 4:5 or more, about 9:10 or more, or about 1:1 or more. In another preferred embodiment, the ratio is about 10:1 or less, about 5:1 or less, about 10:3 or less, about 5:2 or less, about 2:1 or less, about 5:3 or less, about 10:7 or less, about 5:4 or less, about 10:9 or less, or about 1:1 or less. Thus, in a series of preferred embodiments, the compatibilizing agent can be present in the composition in a ratio of moles of compatibilizing agent to molar equivalents of peroxide bonds of about 1:10 to about 10:1, about 1:5 to about 5:1, about 1:4 to about 4:1, about 3:10 to about 10:3, about 2:5 to about 5:2, or about 1:2 to about 2:1.

A free radical generator is employed in the present invention to cause polymer chain scission and thereby positively affect the MFR of the heterophasic polyolefin polymer composition, while generating sufficient free radicals to foster the reaction of the compatibilizing agent with the polyolefin polymers in the composition. The free radical generator may be a chemical compound, such as an organic peroxide or a bis-azo compound, or free radicals may be generated by applying ultrasound, shear, an electron beam (for example β-rays), light (for example UV light), heat and radiation (for example γ-rays and X-rays), to the reaction system, or combinations of the foregoing.

Organic peroxides having one or more 0-0 functionalities are of particular utility in the present invention. Examples of such organic peroxides include: 2,5-dimethyl-2,5-di(t-butylperoxy)hexane, 2,5-dimethyl-2,5-di(t-butyl peroxy)hexyne-3,3,6,6,9,9-pentamethyl-3-(ethyl acetate)-1,2,4,5-tetraoxy cyclononane, t-butyl hydroperoxide, hydrogen peroxide, dicumyl peroxide, t-butyl peroxy isopropyl carbonate, di-t-butyl peroxide, p-chlorobenzoyl peroxide, dibenzoyl diperoxide, t-butyl cumyl peroxide; t-butyl hydroxyethyl peroxide, di-t-amyl peroxide and 2,5-dimethylhexene-2,5-diperisononanoate, acetylcyclohexanesulphonyl peroxide, diisopropyl peroxydicarbonate, tert-amyl perneodecanoate, tert-butyl-perneodecanoate, tert-butylperpivalate, tert-amylperpivalate, bis(2,4-dichlorobenzoyl)peroxide, diisononanoyl peroxide, didecanoyl peroxide, dioctanoyl peroxide, dilauroyl peroxide, bis(2-methylbenzoyl)peroxide, disuccinoyl peroxide, diacetyl peroxide, dibenzoyl peroxide, tert-butyl per-2-ethylhexanoate, bis(4-chlorobenzoyl)peroxide, tert-butyl perisobutyrate, tert-butyl permaleate, 1,1-bis(tert-butylperoxy)-3,5,5-trimethylcyclo-hexane, 1,1-bis(tert-butylperoxy)cyclohexane, tert-butyl peroxyisopropyl carbonate, tert-butyl perisononaoate, 2,5-dimethylhexane 2,5-dibenzoate, tert-butyl peracetate, tert-amyl perbenzoate, tert-butyl perbenzoate, 2,2-bis(tert-butylperoxy)butane, 2,2-bis(tert-butylperoxy)propane, dicumyl peroxide, 2,5-dimethylhexane 2,5-di-tert-butylperoxid, 3-tert-butylperoxy-3-phenyl phthalide, di-tert-amyl peroxide, α,α'-bis(tert-butylperoxyisopropyl)benzene, 3,5-bis(tert-butylperoxy)-3,5-dimethyl-1,2-dioxolane, di-tert-butyl peroxide, 2,5-dimethylhexyne 2,5-di-tert-butyl peroxide, 3,3,6,6,9,9-hexamethyl-1,2,4,5-tetraoxacyclononane, p-menthane hydroperoxide, pinane hydroperoxide, diisopropylbenzene mono-α-hydroperoxide, cumene hydroperoxide or tert-butyl hydroperoxide.

The organic peroxide can be present in the polymer composition in any suitable amount. The suitable amount of organic peroxide will depend upon several factors, such as the particular polymer that is used in the composition, the starting MFR of the polymer, and the desired change in the MFR of the polymer. In a preferred embodiment, the organic peroxide can be present in the polymer composition in an amount of about 10 ppm or more, about 50 ppm or more, or about 100 ppm or more, based on the total weight of the polymer composition. In another preferred embodiment, the organic peroxide can be present in the polymer composition in an amount of about 2 wt. % (20,000 ppm) or less, about 1 wt. % (10,000 ppm) or less, about 0.5 wt. % (5,000 ppm) or less, about 0.4 wt. % (4,000 ppm) or less, about 0.3 wt. % (3,000 ppm) or less, about 0.2 wt. % (2,000 ppm) or less, or about 0.1 wt. % (1,000 ppm) or less, based on the total weight of the polymer composition. Thus, in a series of preferred embodiments, the organic peroxide can be present in the polymer composition in an amount of about 10 to about 20,000 ppm, about 50 to about 5,000 ppm, about 100 to about 2,000 ppm, or about 100 to about 1,000 ppm, based on the total weight of the polymer composition. The amount of organic peroxide can also be expressed in terms of a molar ratio of the compatibilizing agent and peroxide bonds, as is described above.

Suitable bis azo compounds may also be employed as a source of free radicals. Such azo compounds are for example 2,2'-azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), 1,1'-azobis(1-cyclohexanecarbonitrile), 2,2'-azobis(isobutyramide)dihydrate, 2-phenylazo-2,4-dimethyl-4-methoxyvaleronitrile, dimethyl 2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethyleneisobutyramidine) as free base or hydrochloride, 2,2'-azobis(2-amidinopropane) as free base or hydrochloride, 2,2'-azobis{2-methyl-N-[1,1-bis(hydroxymethyl)ethyl]propionamide} or 2,2'-azobis{2-methyl-N-[1,1-bis(hydroxymethyl)-2-hydroxyethyl]propionamide}.

Other chemical compounds useful as free radical initiators include 2,3-dimethyl-2,3-diphenylbutane and sterically hindered hydroxylamine ester.

The various radical generators may be employed alone or in combination.

The heterophasic polyolefin composition of the present invention is compatible with various types additives, conventionally used in thermoplastic compositions, including stabilizers, UV absorbers, hindered-amine light stabilizers (HALS), antioxidants, flame retardants, acid neutralizers, slip agents, antiblocking agents, antistatic agents, antiscratch agents, processing aids, blowing agents, colorants, opacifiers, clarifiers, and/or nucleating agents. By way of further example, the composition may comprise fillers, such as calcium carbonate, talc, glass fibers, glass spheres, inorganic whiskers such as Hyperform® HPR-803i available from Milliken Chemical, USA, magnesium oxysulfate whiskers, calcium sulfate whiskers, calcium carbonate whiskers, mica, wollastonite, clays, such as montmorillonite, and bio-sourced or natural filler. The additives may comprise up to 75 wt. % of the total components in the modified heterophasic polyolefin composition.

The heterophasic polyolefin composition of the present invention may be used in conventional polymer processing applications, including but not limited to injection molding, thin-wall injection molding, single-screw compounding, twin-screw compounding, Banbury mixing, co-kneader mixing, two-roll milling, sheet extrusion, fiber extrusion, film extrusion, pipe extrusion, profile extrusion, extrusion coating, extrusion blow molding, injection blow molding, injection stretch blow molding, compression molding, extrusion compression molding, compression blow forming, compression stretch blow forming, thermoforming, and rotomolding. Thermoplastic polymer articles made using the thermoplastic polymer composition of the invention can be comprised of multiple layers, with one or any suitable number of the multiple layers containing a thermoplastic polymer composition of the invention. By way of example, typical end-use products include containers, packaging, automotive parts, bottles, expanded or foamed articles, appliance parts, closures, cups, furniture, housewares, battery cases, crates, pallets, films, sheet, fibers, pipe, and rotationally molded parts.

The following examples further illustrate the subject matter described above but, of course, should not be construed as in any way limiting the scope thereof. The following methods, unless noted, were used to determine the properties described in the following examples.

Each of the compositions was compounded by blending the components in a closed container for approximately one minute. The compositions were then melt compounded on a Prism TSE-16-TC co-rotating, fully intermeshing, parallel, twin-screw extruder with a 16 mm screw diameter and a length/diameter ratio of 25:1. The barrel temperature of the extruder was ramped from approximately 195° C. to approximately 215° C., and the screw speed was set at approximately 500 rpm. The extrudate (in the form of a strand) for each polypropylene copolymer composition was cooled in a water bath and subsequently pelletized.

The pelletized compositions were then used to form bars by injection molding the compositions on a Nissei HM7 7 ton injection molder having a 14 mm diameter screw. The barrel temperature of the injection molder was approximately 215 to 230° C., and the mold temperature was approximately 25° C. The resulting bars measured approximately 80 mm long, approximately 10 mm wide, and approximately 4.0 mm thick.

The melt flow rate (MFR) was determined on the pelletized compositions according to (ASTM D1238) at 230° C. with a load of 2.16 kg for polypropylene.

The notched Izod impact strength for the bars was measured according to ISO method 180/A. The notched Izod impact strength was measured at +23° C. on bars that had been conditioned at either +23° C. or −30° C.

The molecular weight distribution (MWD) as well as the weight average of said distribution, $M_W$, was determined using gel permeation chromatography (GPC), also referred to as size exclusion chromatography (SEC). All measurements were conducted by the use of the Agilent PL-GPC 220 GPC/SEC system containing (3) 300×7.5 mm PLgel 10 μm Mixed-B LS, a Refractive Index detector, Viscometer and 15° and 90° Light Scattering detector (at 160° C.) with trichlorobenzene inhibited with 125 ppm butylhydroxytoluene as mobile phase, a column temperature of 160° C. and a sample concentration of approx. 1 mg/ml. In the examples listed below, a 15° light scattering detector is chosen to measure concentration. Gel permeation chromatography is a separation technique in which molecules are separated on the basis of hydrodynamic molecular volume or size. With proper column calibration or by the use of molecular-weight-sensitive detectors, such as light scattering or viscometry the molecular weight distribution and the statistical molecular weight averages can be obtained. In gel permeation chromatography, molecules pass through a column via a combination of transport into and through beads along with between beads in the column. The time required for passage of a molecule through the column is decreased with increasing molecular weight. The amount of polymer exiting the column at any given time is measured with various detectors. A more in depth description of the instrumentation and detectors can be found in the chapter titled "Composition, Molar Mass and Molar Mass Distribution" in *Characterization and Analysis of Polymers* by Ron Clavier (2008).

Xylene solubles were determined by a modified ASTM D5492-10 and are a measure of the amount of rubber present in the heterophasic polypropylene copolymers. Approximately 0.6 g of polymer was weighed out and placed into a round-bottom flask along with a stir bar. 50 mL of xylene was added to the polymer in the flask. The polymer xylene mixture was heated to reflux temperature while vigorously stirring. Once the reflux temperature was reached, the solution was stirred for an additional 30 min then cooled to room temperature. The resulting polymer/xylene mixture was gently stirred to break up any precipitated polymer gel then poured through a No. 4 filter paper, both the filtrate containing the soluble fraction and the insoluble fraction were collected. A 10 mL aliquot of the filtrate was taken with a Class A pipet and transferred into a weighed pan. The pan containing the filtrate was then placed on a temperature-controlled hot plate maintaining a temperature of 155° C. to evaporate the xylene. Once most of the xylene was evaporated, the pan was transferred to a vacuum oven set at a temperature of 80±10° C. The pressure was reduced to less than 13.3 kPa and the sample was dried for approximately 2 hours or until a constant weight was achieved. The pan mass was then subtracted giving the mass of the residual soluble polymer. The percentage of soluble polymer in the original sample was calculated as follows:

$$S_s = ((V_{bo}/V_{b1}) * (W_2 - W_1))/W_0) * 100$$

where: $S_s$=soluble fraction of sample, %; $V_{bo}$=original volume of solvent, mL; $V_{b1}$=volume of aliquot used for soluble determination, mL; $W_2$=mass of pan and soluble, g; $W_1$=mass of pan, g; and $W_o$=mass of original sample, g.

EXAMPLE 1

The following example demonstrates the modification of a heterophasic polyolefin composition and performance enhancements achieved, according to the method of the present invention.

Four heterophasic polymer compositions were produced. Comparative Sample 1A (C.S. 1A) was an unmodified polypropylene copolymer. Comparative Sample 1B (C.S. 1B) was made with the same polypropylene copolymer vis-broken using a peroxide. Samples 1A and 1B were made with the same vis-broken polypropylene copolymer compounded with 2-(furan-2-ylmethylene)malononitrile (Compound ID 1 from Table 7 below) as a compatibilizing agent. The general formulation for these samples is set forth in Table 1.

TABLE 1

| Heterophasic polypropylene copolymer formulations | |
|---|---|
| Component | Loading |
| Polypropylene copolymer (LyondellBasell Pro-Fax SD375S with approximately 19% xylene solubles) | Balance |
| Primary antioxidant (Irganox ® 1010) | 500 ppm |
| Secondary antioxidant (Irgafos ® 168) | 1000 ppm |
| Acid scavenger (calcium stearate) | 800 ppm |
| Peroxide (Varox DBPH) | See Table 2 |

TABLE 1-continued

Heterophasic polypropylene copolymer formulations

| Component | Loading |
| --- | --- |
| Additive (Compatibilizing Agent) Compound ID 1 | See Table 2 |

Irganox ® 1010 is available from BASF
Irgafos ® 168 is available from BASF
Varox DBPH is an organic peroxide available from R.T. Vanderbilt Company Each of the compositions listed in Table 2 was mixed, extruded, and injection molded according to the above procedure. The bars were then subjected to melt flow rate and Izod impact testing described above, and evaluated using the 15° light scattering detector signal during testing by Gel Permeation Chromatography (GPC).

TABLE 2

Performance in medium-impact, heterophasic polypropylene copolymer.

| | Sample | | | |
| --- | --- | --- | --- | --- |
| | C.S. 1A | C.S. 1B | 1A | 1B |
| Peroxide Loading (ppm) | — | 1000 | 1000 | 1000 |
| Additive Loading (Molar ratio Additive: O—O) | — | — | 1:1 | 2:1 |
| Additive Loading (ppm) | — | — | 992 | 1985 |
| Melt Flow Rate (g/10 min) | 17 | 102 | 43 | 27 |
| Izod impact at 23° C. (J/m) | 111 | 54 | 156* | Non-break |
| Izod impact at −30° C. (J/m) | 49 | 38 | 55 | 53 |

*also gave partial failures and non-breaks

The resulting change in polymer molecular weight for each of the compositions is shown in FIG. 1. When peroxide is added to polypropylene, the molecular weight is decreased as indicated by the peak shift to longer retention times and there is a relative decrease in signal at retention times less than about 1000 seconds. The inventive compositions (Samples 1A and 1B) show a shift back to shorter retention times (higher molecular weights) and a pronounced shoulder at a retention time of about 950 seconds, not observed in the unmodified or peroxide modified heterophasic resin. This shoulder indicates the formation of a modified polymer with molecular weight higher than that of either the unmodified or peroxide modified heterophasic resin.

EXAMPLE 2

The following example investigates the effects of using a compatibilizing agent in a non-heterophasic polyolefin composition.

Four non-heterophasic polymer compositions were produced. Comparative Sample 2A (C.S. 2A) was an unmodified polypropylene polymer. Comparative Sample 2B (C.S. 2B) was made with the same polypropylene polymer vis-broken using a peroxide. Comparative Samples 2C and 2D were made with the same vis-broken polypropylene polymer compounded with 2-(furan-2-ylmethylene)malononitrile as a compatibilizing agent. The general formulation for these samples is set forth in Table 3.

TABLE 3

Non-heterophasic polypropylene homopolymer formulations

| Component | Loading |
| --- | --- |
| Polypropylene Homopolymer (Total Petrochemicals 3276) | Balance |
| Primary antioxidant (Irganox ® 1010) | 500 ppm |
| Secondary antioxidant (Irgafos ® 168) | 1000 ppm |
| Acid scavenger (calcium stearate) | 800 ppm |
| Peroxide (Varox DBPH) | See Table 4 |
| Additive (Compatibilizing Agent) 2-(furan-2-ylmethylene)malononitrile | See Table 4 |

Irganox ® 1010 is available from BASF
Irgafos ® 168 is available from BASF
Varox DBPH is an organic peroxide available from R. T. Vanderbilt Company

TABLE 4

Performance in non-heterophasic polypropylene homopolymer formulations.

| | Sample | | | |
| --- | --- | --- | --- | --- |
| | C.S. 2A | C.S. 2B | C.S. 2C | C.S. 2D |
| Peroxide Loading (ppm) | — | 1000 | 1000 | 1000 |
| Additive Loading (Molar ratio Additive: O—O) | — | — | 1:1 | 2:1 |
| Additive Loading (ppm) | — | — | 992 | 1985 |
| Melt Flow Rate (g/10 min) | 2 | 34 | 18 | 9 |
| Izod impact at 23° C. (J/m) | 15 | 17 | 13 | 12 |

Each of the compositions listed in Table 4 was mixed, extruded, and injection molded according to the above procedure. The bars were then subjected to melt flow rate and Izod impact testing described above, and evaluated using the 15° light scattering detector signal during testing by Gel Permeation Chromatography (GPC).

Figure 2:
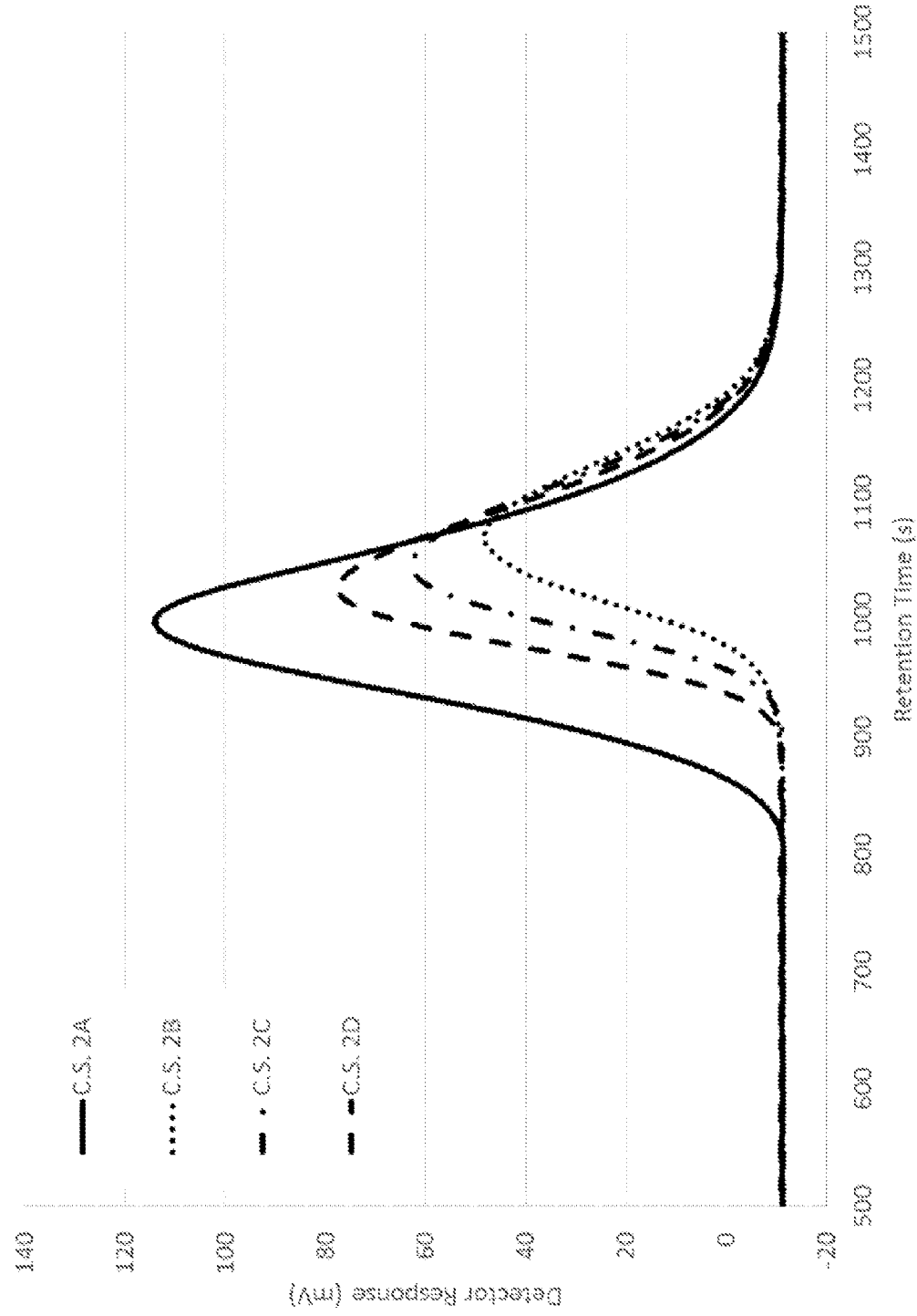
FIG. 2 shows GPC curves for C.S. 2A-2D from Example 2.

The GPC data for Comparative Samples 2A-2D are shown in FIG. 2. When peroxide is added to the homopolymer polypropylene, the molecular weight is decreased, as indicated by the shift to longer retention times. Comparative Samples 2C and 2D, which contain 2-(furan-2-ylmethylene) malononitrile, show a shift back to shorter retention times (higher molecular weights) as the additive counteracts the peroxide. However, the samples do not show the shoulder as seen with Samples 1A and 1B in FIG. 1.

EXAMPLE 3

The following example demonstrates the production of several heterophasic polyolefin compositions as described above and investigates the performance enhancements achieved through the incorporation of the compatibilizing agents as described above.

In order to permit a comparison of the various compatibilizing agents and their effects on the physical properties of a heterophasic polymer composition, the relationship between melt flow rate and Izod impact of a commercially-available polypropylene copolymer (LyondellBasell Pro-Fax SD375S) was investigated by vis-breaking the polymer using several different loadings of a commercially-available peroxide (Varox BDPH). A compatibilizing agent according to the invention was not used in these compositions. The raw MFR and Izod impact values obtained from these measurements were then indexed to the MFR and Izod impact values of the virgin, unmodified polymer (not vis-broken) to provide relative values. The relative MFR and Izod impact values are reported in Table 5 below.

TABLE 5

Relative MFR and Izod impact values of a commercially-available polypropylene copolymer.

| Peroxide Loading (ppm) | Relative MFR ($M_R$) | Relative Izod ($I_R$) |
|---|---|---|
| 0 | 1.00 | 1.00 |
| 250 | 2.09 | 0.74 |
| 500 | 3.35 | 0.63 |
| 1000 | 5.44 | 0.54 |

These relative values were then plotted and a trendline fitted to the plot to produce a mathematical equation expressing the observed relationship between the relative MFR and the relative Izod impact of the polymer. The fit of a trendline yielded the following mathematical equation:

$$I_R = 0.9866 \times M_R^{-0.369}$$

In the equation, $I_R$ is the relative Izod impact value and $M_R$ is the relative MFR. The $R^2$ value for the trendline was 0.996, indicating that the trendline fit the data very well. The quality of the fit also shows that the equation can be used to calculate an expected Izod impact value once the MFR has been measured and the relative MFR calculated. In this sense, the "expected Izod impact value" is the value that the vis-broken polymer is expected to exhibit at a given relative MFR in the absence of a compatibilizing agent. When a compatibilizing agent is used, this expected Izod impact value can then be compared to the measured Izod impact value to ascertain and quantify the effect of the compatibilizing agent on the strength of the polymer. This difference between the expected Izod impact value and the measured Izod impact value is reported below in Tables 8 and 9 for several compounds.

Compatibilizing agents according to the invention and comparative compounds were each melt mixed into different batches of heterophasic polypropylene copolymer compositions, in accordance with the general formulation set forth in Table 6. Tables 7-9 set forth the structure of the compatibilizing agent or comparative compound used in each composition.

TABLE 6

Polypropylene copolymer formulations.

| Component | Loading |
|---|---|
| Polypropylene copolymer (LyondellBasell Pro-Fax SD375S with approximately 19% xylene solubles) | Balance |
| Primary antioxidant (Irganox ® 1010) | 500 ppm |
| Secondary antioxidant (Irgafos ® 168) | 1000 ppm |
| Acid scavenger (calcium stearate) | 800 ppm |
| Peroxide (Varox DBPH) | 1000 ppm |
| Compatibilizing Agent | See Tables 7-9 |

Irganox ® 1010 is available from BASF
Irgafos ® 168 is available from BASF
Varox DBPH is available from R. T. Vanderbilt Company Each of the heterophasic polypropylene copolymer compositions was mixed, extruded, and injection molded according to the procedure described above. The melt flow rate and Izod impact values (at 23° C.) for the compositions were measured and the relative melt flow rate and Izod impact values calculated as described above. The relative melt flow rate and percent change from the expected Izod impact value for each composition are reported in Tables 8 and 9 below. Some of the tested compositions containing a compatibilizing agent according to the invention did not completely fracture during the Izod impact testing. These compositions are reported in Tables 8 and 9 as "Non-Break" and "Partial." Since these "Non-Break" and "Partial" break samples did not completely fracture, the Izod impact value of the samples could not be quantified using this test. In other words, the impact strength of these samples exceeded the limits of the test. Since the impact strength of the "Non-Break" and "Partial" break samples could not be quantified using the same test as the unmodified polypropylene copolymer (i.e., the vis-broken copolymer without a compatibilizing agent), a relative Izod impact value could not be calculated. Nevertheless, the fact that samples did not fracture completely during the test reveals that the impact strength of the polymer was significantly increased.

TABLE 7

Compatibilizing agent identification numbers (Compound ID) and compound structures.

| Compound ID | Compound Structure |
|---|---|
| 1 | 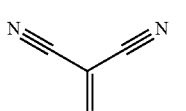 |
| 2 | 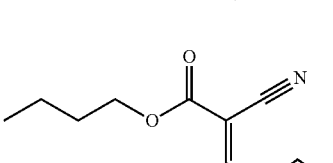 |

TABLE 7-continued

Compatibilizing agent identification numbers (Compound ID) and compound structures.

| Compound ID | Compound Structure |
|---|---|
| 3 | pyrrole-CH=C(CN)$_2$ |
| 4 | thiophene-CH=C(CN)$_2$ |
| 5 | pyrrole-CH=C(CN)(CO$_2$Et) |
| 6 | 4-HO-C$_6$H$_4$-CH=C(CN)(CO$_2$Et) |
| 7 | 4-MeO-C$_6$H$_4$-CH=C(CN)$_2$ |
| 9 | C$_6$H$_5$-CH=C(CN)$_2$ |
| 10 | 2-Cl-C$_6$H$_4$-CH=C(CN)(CO$_2$Me) |
| 12 | thiophene-CH=C(CN)(CO$_2$Et) |

TABLE 7-continued

Compatibilizing agent identification numbers (Compound ID) and compound structures.

| Compound ID | Compound Structure |
|---|---|
| 13 | ethyl 2-cyano-3-(benzo[d][1,3]dioxol-5-yl)acrylate |
| 14 | diethyl 2,2'-(1,4-phenylene)bis(2-cyanoacrylate) — bis(cyanoacrylate) on 1,4-phenylene |
| 16 | 2-(3,4-dimethylbenzylidene)malononitrile |
| 17 | ethyl 2-cyano-3-(9H-fluoren-2-yl)acrylate |
| 18 | ethyl 2-cyano-3-(3,5-di-tert-butyl-4-hydroxyphenyl)acrylate |
| 19 | diethyl 3,3'-(thiophene-2,5-diyl)bis(2-cyanoacrylate) |
| 20 | 2-(4-nitrobenzylidene)malononitrile |

TABLE 7-continued

Compatibilizing agent identification numbers (Compound ID) and compound structures.

| Compound ID | Compound Structure |
|---|---|
| 21 | 2-(4-(dimethylamino)benzylidene)malononitrile |
| 22 | 2-(4-(benzyloxy)benzylidene)malononitrile |
| 23 | 2-(4-bromobenzylidene)malononitrile |
| 24 | 2-(4-ethoxybenzylidene)malononitrile |
| 25 | 2-(3,5-di-tert-butyl-4-hydroxybenzylidene)malononitrile |
| 26 | 2,2'-(thiophene-2,5-diylbis(methanylylidene))dimalononitrile |
| 27 | 2-(3-methoxybenzylidene)malononitrile |
| 28 | 2-(3-vinylbenzylidene)malononitrile |

TABLE 7-continued

Compatibilizing agent identification numbers (Compound ID) and compound structures.

| Compound ID | Compound Structure |
|---|---|
| 29 | 3-fluorobenzylidenemalononitrile |
| 30 | 3-isobutylbenzylidenemalononitrile |
| 31 | 4-fluorobenzylidenemalononitrile |
| 32 | 4-(allyloxy)benzylidenemalononitrile |
| 33 | 3-phenyl-2-propynylidenemalononitrile |
| 34 | 4-biphenylylmethylenemalononitrile |
| 35 | 1,4-phenylenebis(methylylidene)bis(malononitrile) |
| 36 | (2,2'-bithiophen-5-yl)methylenemalononitrile |

TABLE 7-continued

Compatibilizing agent identification numbers (Compound ID) and compound structures.

| Compound ID | Compound Structure |
|---|---|
| 37 | |
| 38 | |
| 39 | |
| 40 | |
| 41 | |
| 42 | |

TABLE 7-continued

Compatibilizing agent identification numbers (Compound ID) and compound structures.

| Compound ID | Compound Structure |
|---|---|
| 44 | ethyl 2-cyano-3,3-diphenylacrylate |
| 45 | 2-ethylhexyl 2-cyano-3,3-diphenylacrylate |
| 46 | ethyl 2-cyano-3-phenyl-2-butenoate |
| 47 | diethyl 2-(furan-2-ylmethylene)malonate |
| 48 | 2-(4-(diphenylamino)phenyl)methylene)malononitrile |
| 49 | 2-([1,1'-biphenyl]-4-ylmethylene)malononitrile |
| 50 | 2,2'-([1,1'-biphenyl]-4,4'-diylbis(methanylylidene))dimalononitrile |

TABLE 7-continued

Compatibilizing agent identification numbers (Compound ID) and compound structures.

| Compound ID | Compound Structure |
|---|---|
| 51 | 4-(trifluoromethyl)benzylidenemalononitrile |
| 52 | octyl 2-cyano-3-(furan-2-yl)acrylate |
| 53 | 2-(1-(furan-2-yl)ethylidene)malononitrile |
| 54 | ethyl 2-cyano-3-(4-(trifluoromethyl)phenyl)acrylate |
| 59 | ethyl 2-cyano-3-(pyridin-4-yl)acrylate |
| 60 | ethyl 2-cyano-3-methylbut-2-enoate |
| 61 | methyl 2-cyano-3-(5-methylfuran-2-yl)acrylate |

TABLE 7-continued

Compatibilizing agent identification numbers (Compound ID) and compound structures.

| Compound ID | Compound Structure |
| --- | --- |
| 62 | (5-methylfuran-2-yl)methylene cyanoacetate, octyl ester |
| 63 | 1,4-butanediyl bis(2-cyano-3-(thiophen-2-yl)acrylate) |
| 64 | dioctyl 2,2'-(thiophene-2,5-diylbis(methanylylidene))bis(2-cyanoacetate) |
| 65 | ethyl 2-cyano-3-(thiazol-2-yl)acrylate |
| 66 | ethyl 2-cyano-3-(1-methyl-1H-imidazol-2-yl)acrylate |
| 67 | ethyl 3-(5-chlorofuran-2-yl)-2-cyanoacrylate |
| 68 | dioctyl 2,2'-(furan-2,5-diylbis(methanylylidene))bis(2-cyanoacetate) |
| 69 | ethyl 2-cyano-5-(furan-2-yl)penta-2,4-dienoate |

TABLE 7-continued

Compatibilizing agent identification numbers (Compound ID) and compound structures.

| Compound ID | Compound Structure |
| --- | --- |
| 70 | ethyl 2-cyano-5,5-diphenylpenta-2,4-dienoate |
| 73 | octyl 2-cyano-2-(9H-fluoren-9-ylidene)acetate |
| 78 | ethyl 2-cyano-3-(furan-2-yl)acrylate |
| 80 | 3,4-dimethylfuran-2,5-dione |
| 83 | 2-((5-nitrofuran-2-yl)methylene)malononitrile |
| 84 | 2-(4-(thiophen-2-yl)benzylidene)malononitrile |
| 85 | 4-(2,2-dicyanovinyl)phenyl methacrylate |

TABLE 7-continued

Compatibilizing agent identification numbers (Compound ID) and compound structures.

| Compound ID | Compound Structure |
|---|---|
| 86 | [structure: 2-((5-(4-nitrophenyl)furan-2-yl)methylene)malononitrile] |
| 87 | [structure: ethyl 2-cyano-3-(3-vinylphenyl)acrylate] |
| 88 | [structure: 2-(4-ethynylbenzylidene)malononitrile] |
| 89 | [structure: 2,3-diphenylacrylonitrile] |
| 90 | [structure: 3-(furan-2-yl)-2-phenylacrylonitrile] |
| 91 | [structure: 2-(3,3-diphenylpropylidene)malononitrile] |
| 94 | [structure: ethyl 2-cyano-3-(5-(hydroxymethyl)furan-2-yl)acrylate] |

TABLE 7-continued

Compatibilizing agent identification numbers (Compound ID) and compound structures.

| Compound ID | Compound Structure |
| --- | --- |
| 95 | |
| 96 | |
| 98 | |
| 100 | |
| 101 | |
| 102 | |

TABLE 8

Results for compounds loaded at a ratio of 1 mole compound per 1 mole of peroxide bonds.

| Sample | Compound ID | Relative MFR | Change in Izod Impact over Expected Value |
| --- | --- | --- | --- |
| 3-1 | 1 | 2.57 | 100.6% |
| 3-2 | 2 | 3.27 | 82.7% |
| 3-3 | 3 | 3.52 | 38.5% |
| 3-4 | 4 | 3.16 | 82.0% |
| 3-5 | 5 | 4.62 | −4.0% |
| 3-6 | 6 | 3.90 | 20.8% |
| 3-7 | 7 | 3.68 | 16.3% |
| 3-8 | 9 | 3.37 | 24.8% |
| 3-9 | 10 | 4.50 | 7.8% |
| 3-10 | 12 | 3.72 | 48.2% |
| 3-11 | 13 | 4.67 | 3.6% |
| 3-12 | 14 | 3.67 | 61.3% |

TABLE 8-continued

Results for compounds loaded at a ratio of 1 mole compound per 1 mole of peroxide bonds.

| Sample | Compound ID | Relative MFR | Change in Izod Impact over Expected Value |
|---|---|---|---|
| 3-13 | 16 | 3.34 | 29.0% |
| 3-14 | 17 | 3.38 | 19.2% |
| 3-15 | 18 | 4.64 | −0.6% |
| 3-16 | 19 | 2.32 | 85.5% |
| 3-17 | 20 | 1.93 | 74.3% |
| 3-18 | 21 | 3.96 | 14.7% |
| 3-19 | 22 | 3.58 | 33.7% |
| 3-20 | 23 | 3.85 | 48.6% |
| 3-21 | 24 | 3.70 | 27.7% |
| 3-22 | 25 | 3.89 | 3.7% |
| 3-23 | 26 | 1.48 | 68.5% |
| 3-24 | 27 | 3.77 | 18.1% |
| 3-25 | 28 | 2.22 | 54.5% |
| 3-26 | 29 | 3.58 | 22.6% |
| 3-27 | 30 | 4.12 | 15.3% |
| 3-28 | 31 | 2.83 | 18.9% |
| 3-29 | 32 | 3.03 | 39.6% |
| 3-30 | 33 | 2.60 | 45.9% |
| 3-31 | 34 | 2.89 | 32.7% |
| 3-32 | 35 | 1.65 | 88.2% |
| 3-33 | 36 | 3.25 | 102.4% |
| 3-34 | 37 | 2.30 | 82.4% |
| 3-35 | 38 | 3.10 | 40.9% |
| 3-36 | 39 | 3.02 | 24.7% |
| 3-37 | 40 | 2.38 | 60.5% |
| 3-38 | 41 | 2.63 | 80.6% |
| 3-39 | 42 | 4.18 | 67.9% |
| 3-40 | 44 | 5.62 | 5.2% |
| 3-41 | 45 | 5.47 | 20.3% |
| 3-42 | 46 | 4.59 | 9.6% |
| 3-43 | 47 | 3.46 | 77.0% |
| 3-44 | 48 | 4.46 | 35.1% |
| 3-45 | 49 | 3.84 | 75.7% |
| 3-46 | 50 | 3.63 | 96.5% |
| 3-47 | 51 | 3.66 | 42.2% |
| 3-48 | 52 | 2.91 | 116.4% |
| 3-49 | 53 | 3.24 | 70.4% |
| 3-50 | 54 | 5.26 | 20.8% |
| 3-51 | 59 | 4.63 | 18.8% |
| 3-52 | 60 | 4.50 | −2.5% |
| 3-53 | 61 | 4.43 | 26.4% |
| 3-54 | 63 | 2.67 | 98.9% |
| 3-55 | 64 | 1.99 | 97.4% |
| 3-56 | 65 | 2.71 | 105.9% |
| 3-57 | 66 | 3.82 | 38.8% |
| 3-58 | 67 | 3.32 | 101.6% |
| 3-59 | 68 | 2.30 | 102.7% |
| 3-60 | 69 | 2.46 | 155.7% |
| 3-61 | 70 | 4.44 | 50.1% |
| 3-62 | 73 | 3.67 | 33.5% |
| 3-63 | 78 | 4.70 | 77.8% |
| 3-64 | 80 | 4.64 | −21.6% |
| 3-65 | 83 | 1.73 | 100.6% |
| 3-66 | 84 | 3.63 | 43.2% |
| 3-67 | 85 | 2.73 | 76.9% |
| 3-68 | 86 | 1.88 | 69.3% |
| 3-69 | 87 | 2.84 | 75.3% |
| 3-70 | 88 | 2.62 | 106.5% |
| 3-71 | 89 | 4.01 | 33.9% |
| 3-72 | 90 | 2.94 | 68.1% |
| 3-73 | 91 | 3.08 | 28.0% |
| 3-74 | 94 | 3.05 | 68.2% |
| 3-75 | 95 | 2.41 | 110.2% |
| 3-76 | 96 | 2.17 | 105.2% |
| 3-77 | 98 | 5.52 | 12.3% |
| 3-78 | 100 | 3.40 | 79.9% |
| 3-79 | 101 | 3.14 | 80.7% |
| 3-80 | 102 | 1.61 | Non-Break |

TABLE 9

Results for compounds loaded at a ratio of 2 moles of compound per 1 mole of peroxide bonds.

| Sample | Compound ID | Relative MFR | Change in Izod Impact over Expected Value |
|---|---|---|---|
| 3-101 | 1 | 1.61 | Non-Break |
| 3-102 | 2 | 2.06 | 113.4% |
| 3-103 | 3 | 2.80 | 46.1% |
| 3-104 | 4 | 2.42 | 94.5% |
| 3-105 | 5 | 3.79 | 19.7% |
| 3-106 | 6 | 2.54 | 36.6% |
| 3-107 | 7 | 2.97 | 24.9% |
| 3-108 | 9 | 2.53 | 27.0% |
| 3-109* | 10 | 3.43 | 20.0% |
| 3-110 | 12 | 3.07 | 49.5% |
| 3-111 | 13 | 3.84 | 10.6% |
| 3-112 | 14 | 2.60 | 30.0% |
| 3-113 | 16 | 3.05 | 34.2% |
| 3-114 | 17 | 2.70 | 25.6% |
| 3-115 | 18 | 3.96 | 8.4% |
| 3-116 | 19 | 1.79 | Non-Break |
| 3-117 | 20 | 1.91 | 67.5% |
| 3-118 | 21 | 3.91 | 33.3% |
| 3-119 | 22 | 3.08 | 40.1% |
| 3-120 | 23 | 2.58 | 59.1% |
| 3-121 | 24 | 3.23 | 35.5% |
| 3-122 | 25 | 3.29 | 7.8% |
| 3-123 | 26 | 1.19 | Non-Break |
| 3-124 | 27 | 2.96 | 33.5% |
| 3-125 | 28 | 1.22 | 58.8% |
| 3-126 | 29 | 2.91 | 37.5% |
| 3-127 | 30 | 3.15 | 22.5% |
| 3-128 | 31 | 2.23 | 31.5% |
| 3-129 | 32 | 2.82 | 35.0% |
| 3-130 | 33 | 2.14 | 95.7% |
| 3-131 | 34 | 2.66 | 45.2% |
| 3-132 | 35 | 1.55 | 84.5% |
| 3-133 | 36 | 2.84 | 132.4% |
| 3-134 | 37 | 1.87 | 124.0% |
| 3-135 | 38 | 2.40 | 48.3% |
| 3-136 | 39 | 2.30 | 50.4% |
| 3-137 | 41 | 2.25 | 87.8% |
| 3-138 | 42 | 3.79 | 116.3% |
| 3-139 | 44 | 5.16 | 5.5% |
| 3-140 | 45 | 5.05 | 8.4% |
| 3-141 | 46 | 4.50 | 16.7% |
| 3-142 | 47 | 2.99 | 134.6% |
| 3-143 | 48 | 3.98 | 39.6% |
| 3-144 | 49 | 2.83 | 68.1% |
| 3-145 | 50 | 3.50 | 116.6% |
| 3-146 | 51 | 2.45 | 52.1% |
| 3-147 | 52 | 2.21 | Partial |
| 3-148 | 53 | 2.49 | 89.4% |
| 3-149 | 54 | 4.68 | 30.9% |
| 3-150 | 59 | 3.11 | 14.4% |
| 3-151 | 60 | 3.82 | 0.5% |
| 3-152 | 61 | 3.43 | 56.3% |
| 3-153 | 62 | 3.72 | 48.5% |
| 3-154 | 63 | 2.26 | 110.7% |
| 3-155 | 64 | 1.68 | 111.3% |
| 3-156 | 65 | 2.11 | 113.0% |
| 3-157 | 66 | 3.52 | 51.3% |
| 3-158 | 67 | 2.49 | 104.5% |
| 3-159 | 68 | 1.50 | Partial |
| 3-160 | 69 | 1.96 | Partial |
| 3-161 | 70 | 3.08 | 64.4% |
| 3-162 | 73 | 2.99 | 52.3% |
| 3-163 | 78 | 2.82 | 89.7% |
| 3-164 | 80 | 4.67 | −7.2% |
| 3-165 | 83 | 1.81 | 82.7% |
| 3-166 | 84 | 3.07 | 58.1% |
| 3-167 | 85 | 2.14 | Non-Break and Partial |
| 3-168 | 86 | 1.93 | 51.7% |
| 3-169 | 87 | 2.37 | 95.8% |
| 3-170 | 88 | 1.86 | 110.9% |
| 3-171 | 89 | 3.72 | 38.4% |
| 3-172 | 90 | 2.51 | 106.4% |
| 3-173 | 91 | 2.41 | 31.3% |
| 3-174 | 94 | 2.50 | 81.8% |

TABLE 9-continued

Results for compounds loaded at a ratio of 2 moles of compound per 1 mole of peroxide bonds.

| Sample | Compound ID | Relative MFR | Change in Izod Impact over Expected Value |
|---|---|---|---|
| 3-175 | 95 | 1.66 | 124.3% |
| 3-176 | 96 | 1.79 | 104.6% |
| 3-177 | 98 | 4.67 | 25.1% |
| 3-178 | 100 | 2.54 | 91.0% |
| 3-179 | 101 | 2.54 | 98.1% |
| 3-180 | 102 | 1.35 | Non-Break |

*Compound 10 was loaded in Sample 3-109 at a molar ratio of 4 moles of compound per 1 mole of peroxide bonds.

The results set forth in Tables 8 and 9 demonstrate that compositions containing compatibilizing agents according to the invention can achieve significant increases in the melt flow rate as compared to the virgin, non-vis-broken resin. These results also demonstrate that compositions containing compatibilizing agents according to the invention can achieve measurable (and in many cases significant) increases in Izod impact strength of the polymer. The significance of the increase can vary depending on the loading of the compatibilizing agent, but each compatibilizing agent according to the invention was able to achieve at least a 5% increase over the expected Izod impact value at one of the tested loadings, which is believed to be a commercially significant increase. Many of the compatibilizing agents were capable of producing greater than 15% increases over the expected Izod impact value. Further, a comparison of the data for Compound ID 60 and Compound ID 80 show that structurally similar compounds (i.e., compounds that are structurally similar to the compatibilizing agent of the invention but do not possess all of the defined features) do not yield significant increases over the expected Izod impact value. Indeed, Compound ID 80 actually led to a measurable decrease over the expected Izod impact value.

EXAMPLE 4

The following example demonstrates the production of a modified heterophasic polyolefin composition, created by melt mixing a polypropylene homopolymer, a polyolefin elastomer, an organic peroxide and the compatibilizing agent of the present invention.

In particular, a 2 dg/min polypropylene homopolymer (Total Petrochemicals 3276), 20 w/w % of a polyolefin elastomer (Engage™ 7467 from The Dow Chemical Company), an organic peroxide (Varox DBPH available from R.T. Vanderbilt Company) and Compound ID 1 were melt mixed and tested. The results were compared to the heterophasic polyolefin composition created when peroxide only was present and when neither the peroxide nor the compatibilizing agent were present.

The loadings of the peroxide and Compound ID 1 are listed in Table 10. Each of the polymer blend compositions was mixed, extruded, and injection molded according to the above procedure. The bars were then subjected to melt flow rate and Izod impact testing described above.

TABLE 10

Heterophasic polyolefin composition formed during melt mixing

| | Sample | | |
|---|---|---|---|
| | C.S. 4A | C.S. 4B | 4A |
| Peroxide Loading (ppm) | — | 1000 | 1500 |
| Additive Loading (Molar ratio Additive: O—O) | — | — | 1:1 |
| Additive Loading (ppm) | — | — | 1490 |
| Melt Flow Rate (g/10 min) | 2.2 | 21 | 10 |
| Izod impact at 23° C. (J/m) | 341 (Partial) | 95 (Complete) | 380 (Partial) |
| Izod impact at −30° C. (J/m) | 22.5 | 36 | 37 |

The blend of the polypropylene homopolymer and the polyolefin elastomer without either the peroxide or the compatibilizing agent (C.S. 4A), exhibits partial break Izod impact behavior at 23° C., but has an undesirably low melt flow rate. When peroxide is added to the blend (C.S. 4B), the melt flow rate increases substantially, but the 23° C. Izod Impact Strength is undesirably reduced from a partial break to 95 J/m. Surprisingly, when Compound ID 1 is added at a 1490 ppm loading, as demonstrated in Sample 4A, the melt flow rate remains high and the 23° C. Izod Impact strength exhibits partial break behavior. The inventive Sample 4A achieves a desirable balance of high melt flow rate and high Izod Impact Strength performance.

EXAMPLE 5

The following example demonstrates the production of compositions and performance enhancements achieved through the incorporation of a compatibilizing agent according to the invention into a high-impact heterophasic polypropylene copolymer.

The resin used for these samples was an 18 MFR high-impact, heterophasic polypropylene copolymer, Pro-Fax SG702 (LyondellBasell Industries) which had approximately 25% xylene solubles. The compositions consisted of the ingredients listed in Table 11.

TABLE 11

High-impact heterophasic polypropylene copolymer

| Component | Amount |
|---|---|
| LyondellBasell Pro-Fax SG702 | Balance |
| Primary antioxidant (Irganox ® 1010) | 500 ppm |
| Secondary antioxidant (Irgafos ® 168) | 1000 ppm |
| Calcium stearate | 400 ppm |
| Varox DBPH | See Table 12 |
| Compound ID 1 | See Table 12 |

Irganox ® 1010 is available from BASF
Irgafos ® 168 is available from BASF
Varox DBPH is available from R. T. Vanderbilt Company Each of the compositions was compounded by blending the components in a closed container for approximately one minute. The compositions were then melt compounded on a Prism TSE-16-TC co-rotating, fully intermeshing, parallel, twin-screw extruder with a 16 mm screw diameter and a length/diameter ratio of 25:1. The barrel temperature of the extruder was ramped from approximately 195° C. to approximately 215° C., and the screw speed was set at approximately 500 rpm. The extrudate (in the form of a strand) for each polypropylene copolymer composition was cooled in a water bath and subsequently pelletized.

The pelletized compositions were then used to form bars by injection molding the compositions on an Arburg 40 ton injection molder having a 25.4 mm diameter screw. The barrel temperature of the injection molder was approximately 200 to 220° C., and the mold temperature was approximately 25° C. The resulting bars measured approximately 127 mm long, approximately 12.7 mm wide, and approximately 3.2 mm thick. The bars were then subjected to the impact tests described below.

The notched Charpy impact strength for the bars was measured according to ASTM method D6110-10. The notched Charpy impact strength was measured at +23° C. on bars that had been conditioned at either +23° C. or −30° C. The melt flow rate (MFR) was determined according to (ASTM D1238) at 230° C. with a load of 2.16 kg for polypropylene. The resulting change in melt flow rate and Charpy impact at 23° C. and −30° C. is listed in Table 12.

TABLE 12

Performance in high-impact, heterophasic polypropylene copolymer

| | Sample | | |
|---|---|---|---|
| | C.S. 5A | C.S. 5B | 5A |
| Peroxide Loading (ppm) | — | 250 | 1000 |
| Additive Loading (Molar ratio Additive: O—O) | — | — | 1:1 |
| Additive Loading (ppm) | — | — | 991 |
| Melt Flow Rate (g/10 min) | 17 | 40 | 40 |
| Charpy impact at 23° C. (J/m) | 159 | 111 | Non-Break |
| Charpy impact at −30° C. (J/m) | 90 | 56 | 115 |

The compositions resulting from the addition of 250 ppm of organic peroxide only (C.S. 5B) demonstrate that as the peroxide is added to the high-impact polypropylene copolymer, the melt flow rate increases significantly, but the Charpy impact at 23° C. and −30° C. decreases undesirably. The use of Compound ID 1 with 1000 ppm peroxide shown in Sample 5A demonstrates a desired increase in melt flow rate while the Charpy impact performance at 23° C. exhibits highly desirable non-break behavior and the Charpy impact performance at −30° C. is also increased.

EXAMPLE 6

The following example demonstrates the production of heterophasic polymer compositions according to the invention.

The heterophasic polymer compositions used in this example were a blend in which the polypropylene homopolymer was a minority component. In other words, the polypropylene hompolymer was the discrete phase of the heterophasic polymer composition. The polymer blends of the present invention consisted of a polyolefin elastomer (Engage™ 8842 from The Dow Chemical Company) and a 2 dg/min polypropylene homopolymer (Total Petrochemicals 3276) in a ratio of 3:1 w/w. 1,000 ppm of an organic peroxide (Varox DBPH available from R.T. Vanderbilt Company) and Compound ID 52 were added to this polymer blend. The loadings of the peroxide and Compound ID 52 are listed in Table 13, with the balance of the blend being the polyolefin elastomer and polypropylene homopolymer. The results were compared to the heterophasic polyolefin composition created when peroxide only was present (C.S. 6B) and when neither the peroxide nor the compatibilizing agent were present (C.S. 6A).

Each of the compositions was compounded by blending the components in a closed container for approximately one minute. The compositions were then melt compounded on a Prism TSE-16-TC co-rotating, fully intermeshing, parallel, twin-screw extruder with a 16 mm screw diameter and a length/diameter ratio of 25:1. The barrel temperature of the extruder was ramped from approximately 195° C. to approximately 215° C., and the screw speed was set at approximately 500 rpm. The extrudate (in the form of a strand) for each polyolefin blend composition was cooled in a water bath and subsequently pelletized. The pelletized compositions were then compression molded on a 12 ton Carver Press at a platen temperature of 230° C. and a holding pressure of approximately 6 tons for approximately 4 minutes into a sheet that was approximately 6" wide, 6" long, and 0.047" thick. ASTM Type IV dog bone specimens were then die cut from these compression-molded sheets. The tensile properties for the ASTM Type IV dog bones were measured according to ASTM method D638 using an MTS Q-Test-5 with a crosshead speed of 20.0 in/min.

TABLE 13

Performance of Polyolefin Blends

| | Sample | | | | |
|---|---|---|---|---|---|
| | C.S. 6A | C.S. 6B | 6A | 6B | 6C |
| Peroxide Loading (ppm) | — | 1000 | 1000 | 1000 | 1000 |
| Additive Loading (Molar ratio Additive: O—O) | — | — | 1:2 | 1:1 | 2:1 |
| Additive Loading (ppm) | — | — | 948 | 2844 | 5692 |
| Tensile Strength at Yield (MPa) | 4.4 | 4.1 | 5.3 | 7.0 | 9.3 |
| Elongation at Yield (%) | 531 | 740 | 599 | 609 | 846 |

The composition comprising peroxide only (no compatibilizing agent) demonstrates that when peroxide is added to a polyolefin blend containing a 3:1 w/w ratio of polyolefin elastomer to polypropylene homopolymer, the tensile yield strength decreases and the elongation at yield increases. When Compound ID 52 is added to this blend, as shown in Samples 6A-6C, the tensile strength at yield increases significantly. The combination of Compound ID 52 with peroxide also increases the elongation at yield over the unmodified resin. Sample 6C also demonstrates that the addition of the compatibilizing agent at a 1:2 molar ratio results in an elongation at yield that is higher than with peroxide only.

EXAMPLE 7

The following example demonstrates the production of a modified masterbatch composition as described above and the physical property improvements that can be achieved through the addition of such a modified masterbatch composition to a heterophasic polyolefin composition.

Three modified masterbatch compositions were produced. Comparative Sample 7-MB (C.S. 7-MB) was made by melt compounding a polypropylene copolymer with a peroxide as a vis-breaking agent. Samples 7A-MB and 7B-MB were made by melting compounding the same polypropylene copolymer with a peroxide as a vis-breaking agent and 2-furylidene malononitrile (Compound ID 1) as a compatibilizing agent. The general formulation for these samples is set forth in Table 14.

TABLE 14

Modified masterbatch formulations.

| Component | Loading |
|---|---|
| Polypropylene copolymer (LyondellBasell Pro-Fax SG702) | Balance |
| Peroxide (Varox DBPH) | See Table 15 |
| Compatibilizing Agent (MN-1) | See Table 15 |

Each of the compositions listed in Table 14 was mixed and extruded according to the procedure described above.

TABLE 15

Modified masterbatch compositions.

| | Sample | | |
|---|---|---|---|
| | C.S. 7-MB | 7A-MB | 7B-MB |
| Peroxide Loading (ppm) | 500 | 1,500 | 3,000 |
| Additive Loading (Molar ratio Additive: O—O) | — | 1:1 | 1:1 |
| Additive Loading (ppm) | — | 2,960 | 5,920 |

Three heterophasic polymer compositions were produced by adding the modified masterbatch compositions described above to a polypropylene copolymer. Comparative Sample 7A (C.S. 7A) was the unmodified polypropylene copolymer. Comparative Sample 7B (C.S. 7B) was made by compounding the unmodified polypropylene copolymer with Comparative Sample 7-MB (C.S. 7-MB). Sample 7A was made by compounding the same unmodified polypropylene copolymer with Sample 7A-MB, and Sample 7B was made by compounding the same unmodified polypropylene copolymer with Sample 7B-MB. The general formulation for these samples is set forth in Tables 16 and 17.

TABLE 16

Heterophasic polypropylene copolymer formulations with modified masterbatches.

| Component | Loading |
|---|---|
| Polypropylene copolymer (Exxon PP7414) | Balance |
| C.S. 7-MB | See Table 17 |
| 7A-MB | See Table 17 |
| 7B-MB | See Table 17 |

Each of the compositions listed in Table 17 was mixed, extruded, and injection molded according to the procedures described above. The resulting bars were then subjected to melt flow rate and Izod impact testing as described above.

TABLE 18

Performance in medium-impact, heterophasic polypropylene copolymer

| | Sample | | | |
|---|---|---|---|---|
| | C.S. 7A | C.S. 7B | 7A | 7B |
| C.S. 7-MB (%) | — | 10 | — | — |
| 7A-MB (%) | — | — | 10 | — |
| 7B-MB (%) | — | — | — | 10 |
| Melt Flow Rate (g/10 min) | 20.7 | 22.9 | 23.2 | 22.6 |
| Izod impact at 23° C. (J/m) | 94.7 | 88.6 | 109.0 | 115.8 |

The data set forth in Table 18 demonstrate that a modified masterbatch according to the invention (e.g., a modified masterbatch made by melt compounding a heterophasic polymer with a vis-breaking agent and a compatibilizing agent) can be melt compounded into an unmodified heterophasic polymer, thereby significantly improving the impact strength of the heterophasic polymer. For example, the data for C.S. 7B show that melt compounding the vis-broken masterbatch C.S. 7-MB into the unmodified heterophasic polymer does not appreciably affect the impact strength of the polymer. In fact, the Izod impact strength for C.S. 7B was actually lower than the Izod impact strength of the unmodified polymer. By way of contrast, the data for Samples 7A and 7B show that melt compounding the unmodified heterophasic polymer with the modified masterbatch compositions Sample 7A-MB and Sample 7B-MB increases the impact strength of the polymer by as much as 22%. This increase in impact strength is particularly valuable because it demonstrates that improved heterophasic polymer compositions can be produced without directly adding the vis-breaking agent and/or compatibilizing agent to the target heterophasic polymer. Direct addition of such additives can be difficult in certain settings, such as compounding facilities and injection molding facilities. However, such facilities routinely utilize masterbatch compositions. Therefore, such facilities could readily achieve the physical property improvements described herein through the use of a modified masterbatch composition as described above.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A heterophasic polymer composition comprising:
   (a) a propylene polymer phase comprising propylene polymers selected from the group consisting of polypropylene homopolymers and copolymers of propylene and up to 50 wt. % of one or more comonomers selected from the group consisting of ethylene and $C_4$-$C_{10}$ α-olefin monomers;
   (b) an ethylene polymer phase comprising ethylene polymers selected from the group consisting of ethylene homopolymers and copolymers of ethylene and one or more $C_3$-$C_{10}$ α-olefin monomers; and
   (c) a compatibilizing agent, the compatibilizing agent comprising (i) an acyclic carbon-carbon double bond having a first carbon atom and a second carbon atom, (ii) an electron withdrawing group directly bonded to the first carbon atom in the acyclic carbon-carbon double bond, and (iii) a second carbon-carbon multiple bond in conjugation with the acyclic carbon-carbon double bond, wherein the second carbon-carbon multiple bond is linked to the acyclic carbon-carbon double bond through the second carbon atom.

2. The heterophasic polymer composition of claim 1, wherein the second carbon-carbon multiple bond is a carbon-carbon double bond.

3. The heterophasic polymer composition of claim 1, wherein the compatibilizing agent is selected from the group consisting of compounds conforming to the structure of Formula (I)

$$\underset{R_2\quad R_4}{\overset{R_1\quad R_3}{\diagdown\diagup}} \tag{I}$$

wherein $R_1$ is selected from the group consisting of aryl groups, substituted aryl groups, heteroaryl groups, substituted heteroaryl groups, and groups conforming to the structure of Formula (V)

(V)

where $R_5$ and $R_6$ are independently selected from the group consisting of hydrogen, alkyl groups, substituted alkyl groups, cycloalkyl groups, substituted cycloalkyl groups, aryl groups, substituted aryl groups, heteroaryl groups, and substituted heteroaryl groups or $R_5$ and $R_6$ can be combined to form a cyclic structure; and x is an integer selected from the group consisting of 0, 1, and 2;

$R_2$ is selected from the group consisting of hydrogen, halogens, alkyl groups, substituted alkyl groups, aryl groups, substituted aryl groups, heteroaryl groups, and substituted heteroaryl groups;

$R_3$ and $R_4$ are independently selected from the group consisting of hydrogen, alkyl groups, substituted alkyl groups, cycloalkyl groups, substituted cycloalkyl groups, cyano groups, nitro groups, and groups conforming to a structure of Formula (VI), (VII), (VIII), or (IX)

(VI)

(VII)

(VIII)

(IX)

where $R_7$ and $R_9$ are independently selected from the group consisting of alkyl groups, substituted alkyl groups, cycloalkyl group, substituted cycloalkyl groups, aryl groups, substituted aryl groups, heteroaryl groups, and substituted heteroaryl groups; $R_8$ is selected from the group consisting of hydrogen, alkyl groups, substituted alkyl groups, cycloalkyl group, substituted cycloalkyl groups, aryl groups, substituted aryl groups, heteroaryl groups, and substituted heteroaryl groups; provided, for groups conforming to the structure of Formula (VIII), $R_7$ and $R_9$ can be combined to form a cyclic structure; and provided at least one of $R_3$ and $R_4$ is selected from the group consisting of cyano groups, nitro groups, and groups conforming to a structure of Formula (VI), (VII), (VIII), or (IX).

4. The heterophasic polymer composition of claim 1, wherein the compatibilizing is selected from the group consisting of compounds conforming to the structure of Formula (X)

(X)

wherein $R_{10}$ is selected from the group consisting of arenediyl groups, substituted arenediyl groups, heteroarenediyl groups, substituted heteroarenediyl groups, and groups conforming to the structure of Formula (XV)

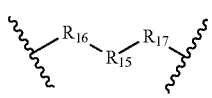
(XV)

where $R_{15}$ is selected from the group consisting of a direct bond between $R_{16}$ and $R_{17}$, an oxygen atom, an alkanediyl group, and a substituted alkanediyl group; $R_{16}$ and $R_{17}$ are independently selected from the group consisting of arenediyl groups, substituted arenediyl groups, heteroarenediyl groups, and substituted heteroarenediyl groups;

$R_{11}$, $R_{12}$, $R_{13}$, and $R_{14}$ are independently selected from the group consisting of hydrogen, alkyl groups, substituted alkyl groups, cycloalkyl groups, substituted cycloalkyl groups, cyano groups, nitro groups, and groups conforming to a structure of Formula (VI), (VII), (VIII), or (IX)

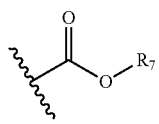
(VI)

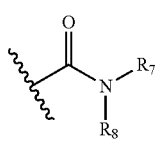
(VII)

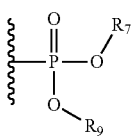
(VIII)

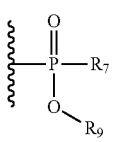
(IX)

where $R_7$ and $R_9$ are independently selected from the group consisting of alkyl groups, substituted alkyl groups, cycloalkyl group, substituted cycloalkyl groups, aryl groups, substituted aryl groups, heteroaryl groups, and substituted heteroaryl groups; $R_8$ is selected from the group consisting of hydrogen, alkyl groups, substituted alkyl groups, cycloalkyl group, substituted cycloalkyl groups, aryl groups, substituted aryl groups, heteroaryl groups, and substituted heteroaryl groups; provided, for groups conforming to the structure of Formula (VIII), $R_7$ and $R_9$ can be combined to form a cyclic structure; and provided at least one of $R_{11}$ and $R_{12}$ and at least one of $R_{13}$ and $R_{14}$ is selected from the group consisting of cyano groups, nitro groups, and groups conforming to a structure of Formula (VI), (VII), (VIII), or (IX).

5. The heterophasic polymer composition of claim 1, wherein the compatibilizing is selected from the group consisting of compounds conforming to the structure of Formula (XX)

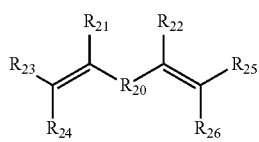
(XX)

wherein $R_{20}$ is a divalent linking group; $R_{21}$ and $R_{22}$ are selected from the group consisting of cyano groups, nitro groups, and groups conforming to a structure of Formula (VI), (VII), (VIII), or (IX)

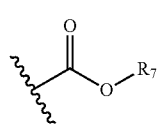
(VI)

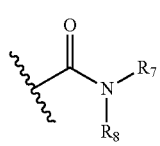
(VII)

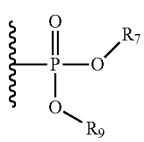
(VIII)

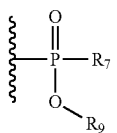
(IX)

where $R_7$ and $R_9$ are independently selected from the group consisting of alkyl groups, substituted alkyl groups, cycloalkyl group, substituted cycloalkyl groups, aryl groups, substituted aryl groups, heteroaryl groups, and substituted heteroaryl groups; $R_8$ is selected from the group consisting of hydrogen, alkyl groups, substituted alkyl groups, cycloalkyl group, substituted cycloalkyl groups, aryl groups, substituted aryl groups, heteroaryl groups, and substituted heteroaryl groups; provided, for groups conforming to the structure of Formula (VIII), $R_7$ and $R_9$ can be combined to form a cyclic structure;

$R_{23}$, $R_{24}$, $R_{25}$, and $R_{26}$ are independently selected from the group consisting of hydrogen, alkyl groups, substituted alkyl groups, cycloalkyl groups, substituted cycloalkyl groups, aryl groups, substituted aryl groups, heteroaryl groups, substituted heteroaryl groups, and groups conforming to the structure of Formula (V)

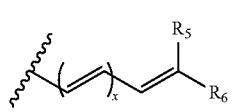
(V)

where $R_5$ and $R_6$ are independently selected from the group consisting of hydrogen, alkyl groups, substituted alkyl groups, cycloalkyl groups, substituted cycloalkyl groups, aryl groups, substituted aryl groups, heteroaryl groups, and substituted heteroaryl groups or $R_5$ and $R_6$ can be combined to form a cyclic structure; and x is an integer selected from the group consisting of 0, 1, and 2; provided at least one of $R_{23}$ and $R_{24}$ and at least one of $R_{25}$ and $R_{26}$ is selected from the group consisting of aryl groups, substituted aryl groups, heteroaryl groups, substituted heteroaryl groups, and groups conforming to the structure of Formula (V).

6. The heterophasic polymer composition of claim 5, wherein $R_{20}$ is a group conforming to the structure of Formula (XXV)

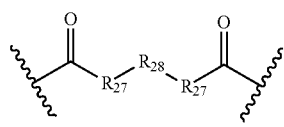

(XXV)

wherein $R_{27}$ is selected from the group consisting of an oxygen atom, —N(H)—, and —N($R_{29}$)—, where $R_{29}$ is selected from the group consisting of alkyl groups, substituted alkyl groups, cycloallkyl groups, and substituted cycloalkyl groups; and $R_{28}$ is selected from the group consisting of alkanediyl groups and cycloalkanediyl groups.

7. The heterophasic polymer composition of claim 5, wherein $R_{20}$ is a group conforming to the structure of Formula (XXX)

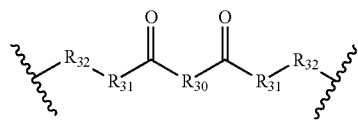

(XXX)

wherein $R_{30}$ is selected from the group consisting of alkanediyl groups and cycloalkanediyl groups; $R_{31}$ is selected from the group consisting of an oxygen atom, —N(H)—, and —N($R_{29}$)—, where $R_{29}$ is selected from the group consisting of alkyl groups, substituted alkyl groups, cycloallkyl groups, and substituted cycloalkyl groups; and $R_{32}$ is selected from the group consisting of arenediyl groups, substituted arenediyl groups, heteroarenediyl groups, and substituted heteroarenediyl groups.

8. The heterophasic polymer composition of claim 1, wherein the ethylene polymers are selected from the group consisting of ethylene-propylene elastomers, ethylene-butene elastomers, ethylene-hexene elastomers, ethylene-octene elastomers, and mixtures thereof.

9. The heterophasic polymer composition of claim 1, wherein the ethylene polymer comprises from 5 to 80 wt. % of the heterophasic polyolefin polymer composition, based on the total weight of propylene polymers and ethylene polymers in the composition.

10. The heterophasic polymer composition of claim 9, wherein the ethylene polymer comprises about 5 to 60 wt. % of the heterophasic polyolefin polymer composition, based on the total weight of propylene polymers and ethylene polymers in the composition.

11. The heterophasic polymer composition of claim 1, wherein the propylene content of the propylene polymer phase is 80 wt. % or greater.

12. The heterophasic polymer composition of claim 1, wherein the ethylene polymer phase is a discontinuous phase in the heterophasic polyolefin polymer composition.

13. The heterophasic polymer composition of claim 1, wherein the compatibilizing agent is present in the heterophasic polyolefin polymer composition in a concentration of from 10 ppm to 5 wt. %, based on the total weight of the composition.

14. A heterophasic polymer composition comprising a continuous phase comprising polypropylene polymers selected from the group consisting of polypropylene homopolymers and copolymers of propylene and up to 80 wt. % of one or more comonomers selected from the group consisting of ethylene and $C_4$-$C_{10}$ α-olefin monomers and a discontinuous phase comprising elastomeric ethylene copolymers having an ethylene content of from 8 to 90 wt. % selected from the group consisting of copolymers of ethylene and one or more $C_3$-$C_{10}$ α-olefin monomers, provided that the propylene content of the propylene polymer phase is greater than the propylene content of the ethylene polymer phase, wherein the composition further comprises propylene polymers bonded to ethylene copolymers by a compatibilizing agent, wherein the compatibilizing agent comprises (i) an acyclic carbon-carbon double bond having a first carbon atom and a second carbon atom, (ii) an electron withdrawing group directly bonded to the first carbon atom in the acyclic carbon-carbon double bond, and (iii) a second carbon-carbon multiple bond in conjugation with the acyclic carbon-carbon double bond, wherein the second carbon-carbon multiple bond is linked to the acyclic carbon-carbon double bond through the second carbon atom.

15. The heterophasic polymer composition of claim 14, wherein the discontinuous phase comprises from 5 to 35 wt. % of the heterophasic polyolefin polymer composition, based on the weight of propylene polymers and ethylene copolymers in the composition.

16. The heterophasic polymer composition of claim 14, wherein the ethylene copolymer comprising the discontinuous phase has an ethylene content of from 8 to 80 wt. %.

17. The heterophasic polymer composition of claim 14, wherein the heterophasic polyolefin polymer composition comprises from 5 to 30 wt. % ethylene, based on the total weight of propylene polymers and ethylene copolymers in the composition.

18. The heterophasic polymer composition of claim 14, wherein the heterophasic polyolefin polymer composition is obtained by operating in at least two polymerization stages.

19. The heterophasic polymer composition of claim 14, wherein the propylene content of the propylene polymer phase is 80 wt. % or greater.

20. The heterophasic polymer composition of claim 14, wherein the compatibilizing agent is present in the heterophasic polyolefin polymer composition in a concentration of from 10 ppm to 5 wt. %, based on the total weight of the composition.

21. A heterophasic polyolefin polymer composition obtained by the process comprising the steps of:
(a) providing a propylene polymer phase comprising propylene polymers selected from the group consisting of polypropylene homopolymers and copolymers of propylene and up to 50 wt. % of one or more comonomers selected from the group consisting of ethylene and $C_4$-$C_{10}$ α-olefin monomers and an ethylene polymer phase comprising ethylene polymers selected from the group consisting of ethylene homopolymers and copolymers of ethylene and one or more $C_3$-$C_{10}$ α-olefin monomers provided that the ethylene content of the ethylene polymer phase is at least 8 wt. %, (b) providing a compatibilizing agent, wherein the compatibilizing agent comprises (i) an acyclic carbon-carbon double bond having a first carbon atom and a second carbon atom, (ii) an electron withdrawing group directly bonded to the first carbon atom in the acyclic carbon-carbon double bond, and (iii) a second carbon-carbon multiple bond in conjugation with the acyclic carbon-carbon double bond, wherein the second carbon-carbon multiple bond is linked to the acyclic carbon-carbon double bond through the second carbon atom; and (c) mixing the propylene polymer phase, the ethylene polymer phase and the compatibilizing agent in the presence of free carbon radicals, whereby propylene polymers are bonded to ethylene polymers by the compatibilizing agent, and whereby the propylene polymer phase and the ethylene polymer phase form a heterophasic composition.

22. The heterophasic polymer composition of claim 21, wherein the propylene polymer phase, the ethylene polymer phase and the compatibilizing agent are mixed in the presence of free carbon radicals by melt compounding, and the composition is heterophasic at 25° C.

23. The heterophasic polymer composition of claim 21, wherein the propylene polymer phase is the continuous phase and the propylene content of the propylene polymer phase is 80 wt. % or greater, and the ethylene polymer phase is the discontinuous phase and the ethylene polymers have an ethylene content of from 8 to 80 wt. % and are selected from the group consisting of copolymers of ethylene and one or more $C_3$-$C_{10}$ α-olefin monomers.

24. A method of making a heterophasic polyolefin polymer composition, the method comprising the steps of:

(a) providing a propylene polymer phase comprising propylene polymers selected from the group consisting of polypropylene homopolymers and copolymers of propylene and up to 50 wt. % of one or more comonomers selected from the group consisting of ethylene and $C_4$-$C_{10}$ α-olefin monomers, and an ethylene polymer phase comprising ethylene polymers selected from the group consisting of ethylene homopolymers and copolymers of ethylene and one or more $C_3$-$C_{10}$ α-olefin monomers provided that the ethylene content of the ethylene polymer phase is at least 8 wt. %, (b) providing a compatibilizing agent, wherein the compatibilizing agent comprises (i) an acyclic carbon-carbon double bond having a first carbon atom and a second carbon atom, (ii) an electron withdrawing group directly bonded to the first carbon atom in the acyclic carbon-carbon double bond, and (iii) a second carbon-carbon multiple bond in conjugation with the acyclic carbon-carbon double bond, wherein the second carbon-carbon multiple bond is linked to the acyclic carbon-carbon double bond through the second carbon atom; and (c) mixing the propylene polymer phase, the ethylene polymer phase and the compatibilizing agent, in the presence of free carbon radicals, whereby the compatibilizing agent reacts with propylene polymers and ethylene polymers thereby bonding propylene polymers to ethylene polymers, and whereby the propylene polymer phase and the ethylene polymer phase form a heterophasic composition.

25. The method of claim 24, wherein the propylene polymer phase, the ethylene polymer phase and the compatibilizing agent are mixed in the presence of free carbon radicals by melt compounding, and the composition is heterophasic at 25° C.

26. The method of claim 24, wherein the propylene polymer phase is the continuous phase and the propylene content of the propylene polymer phase is 80 wt. % or greater, and the ethylene polymer phase is the discontinuous phase and the ethylene polymers have an ethylene content of from 8 to 80 wt. % and are selected from the group consisting of copolymers of ethylene and one or more $C_3$-$C_{10}$ α-olefin monomers.

27. The method of claim 24, wherein the polypropylene phase and the ethylene phase are provided to the mixture as a heterophasic impact copolymer obtained by operating in at least two polymerization stages.

28. The method of claim 24, wherein the compatibilizing agent is present in the heterophasic polyolefin polymer composition in a concentration of from 10 ppm to 5 wt. %, based on the total weight of the composition, and wherein a reaction between the unsaturated bond of the compatibilizing agent and the ethylene polymer is conducted in the presence of a free radical generator selected from the group consisting of organic peroxides incorporating one or more peroxide bonds, and the compatibilizing agent and the organic peroxide are present in a ratio of moles of compatibilizing agent to molar equivalents of peroxide bonds of 1:10 to 10:1.

* * * * *